United States Patent
Mabey et al.

(10) Patent No.: US 10,324,618 B1
(45) Date of Patent: Jun. 18, 2019

(54) SYSTEM AND METHOD FOR FORMATTING AND MANIPULATING DIGITAL INK

(71) Applicant: QuirkLogic, Inc., Calgary (CA)

(72) Inventors: Michael Howatt Mabey, Calgary (CA); Alfonso Fabian de la Fuente, Victoria (CA)

(73) Assignee: QuirkLogic, Inc., Calgary (CA)

( * ) Notice: Subject to any disclaimer, the term of this patent is extended or adjusted under 35 U.S.C. 154(b) by 373 days.

(21) Appl. No.: 15/173,275

(22) Filed: Jun. 3, 2016

Related U.S. Application Data

(60) Provisional application No. 62/275,052, filed on Jan. 5, 2016.

(51) Int. Cl.
| | |
|---|---|
| *G06F 17/00* | (2019.01) |
| *G06F 3/0488* | (2013.01) |
| *G06F 3/041* | (2006.01) |
| *G06F 17/24* | (2006.01) |

(52) U.S. Cl.
CPC ........ *G06F 3/04883* (2013.01); *G06F 3/0416* (2013.01); *G06F 17/242* (2013.01)

(58) Field of Classification Search
CPC ............................. G06F 17/242; G06F 3/04883
See application file for complete search history.

(56) References Cited

U.S. PATENT DOCUMENTS

| | | | | |
|---|---|---|---|---|
| 5,197,432 A | * | 3/1993 | Ballheimer | F02B 1/02 123/193.3 |
| 5,784,504 A | * | 7/1998 | Anderson | G06F 3/04883 345/173 |
| 5,850,477 A | * | 12/1998 | Takada | G06F 3/04883 382/186 |
| 5,953,735 A | * | 9/1999 | Forcier | G06F 3/0488 715/273 |
| 6,687,876 B1 | * | 2/2004 | Schilit | G06F 17/241 715/231 |
| 7,136,082 B2 | * | 11/2006 | Saund | G06K 9/00409 345/619 |
| 7,203,903 B1 | * | 4/2007 | Thompson | G06F 3/04883 382/187 |
| 7,218,779 B2 | * | 5/2007 | Dodge | G06F 3/04883 382/177 |

(Continued)

FOREIGN PATENT DOCUMENTS

| | | |
|---|---|---|
| JP | 2015-191487 A | 11/2015 |
| TW | 201443822 A | 11/2014 |

OTHER PUBLICATIONS

International Search Report issued in corresponding Application No. PCT/CA2017/051330, dated Feb. 12, 2018 (3 pages).

(Continued)

*Primary Examiner* — Laurie A Ries
(74) *Attorney, Agent, or Firm* — Chamberlain, Hrdlicka, White, Williams & Aughtry

(57) ABSTRACT

A system and method for formatting data input on an interactive device. The method includes detecting a stroke input, converting the stroke input into stroke data, making a first determination that the stroke data should be grouped with an existing object group using a proximity threshold, based on the first determination, associating the stroke data with the existing object group, and resetting a timer associated with the existing object group.

27 Claims, 19 Drawing Sheets

(56) References Cited

U.S. PATENT DOCUMENTS

| | | | | |
|---|---|---|---|---|
| 7,305,630 | B2* | 12/2007 | Hullender | G06F 3/04883 345/173 |
| 8,090,366 | B2* | 1/2012 | McNamara | H04L 65/4023 455/424 |
| 8,473,851 | B2* | 6/2013 | DeGrazia | G06F 3/0481 715/753 |
| 8,826,147 | B2* | 9/2014 | Sitrick | G06F 17/241 715/738 |
| 9,575,712 | B2* | 2/2017 | Farouki | H04L 12/1822 |
| 9,740,361 | B2* | 8/2017 | Tan | G06F 3/0484 |
| 9,904,465 | B2* | 2/2018 | Angelov | G06Q 10/101 |
| 2001/0043743 | A1* | 11/2001 | Sakaguchi | G06K 9/00409 382/225 |
| 2002/0157880 | A1* | 10/2002 | Atwood | G06F 3/033 178/20.02 |
| 2003/0007683 | A1* | 1/2003 | Wang | G06K 9/00456 382/159 |
| 2003/0179214 | A1* | 9/2003 | Saund | G06T 11/60 345/619 |
| 2004/0141648 | A1* | 7/2004 | Dodge | G06F 3/04883 382/188 |
| 2005/0091289 | A1* | 4/2005 | Shappell | H04L 29/06 |
| 2005/0149856 | A1* | 7/2005 | Rimas | G06F 17/2294 715/243 |
| 2005/0198591 | A1* | 9/2005 | Jarrett | G06F 3/0481 715/863 |
| 2005/0248545 | A1* | 11/2005 | Nishimura | G06F 1/1626 345/173 |
| 2006/0028457 | A1* | 2/2006 | Burns | G06F 3/03545 345/179 |
| 2006/0257025 | A1* | 11/2006 | Simmons | G06F 17/242 382/186 |
| 2007/0044028 | A1* | 2/2007 | Dunn | G06F 3/03547 715/761 |
| 2007/0124737 | A1* | 5/2007 | Wensley | G06F 9/546 719/314 |
| 2008/0046372 | A1* | 2/2008 | Lutnick | G06F 21/10 705/51 |
| 2008/0114844 | A1* | 5/2008 | Sanchez | G06F 9/543 709/206 |
| 2008/0123976 | A1* | 5/2008 | Coombs | G06T 3/40 382/238 |
| 2008/0231635 | A1* | 9/2008 | Saund | G06K 9/00416 345/440 |
| 2009/0019113 | A1* | 1/2009 | Wu | H04L 12/1881 709/204 |
| 2009/0024918 | A1* | 1/2009 | Silverbrook | B42D 15/02 715/255 |
| 2009/0106093 | A1* | 4/2009 | Folgner | G06Q 10/10 705/14.61 |
| 2009/0273585 | A1* | 11/2009 | De Haan | G06F 3/03545 345/179 |
| 2010/0257239 | A1* | 10/2010 | Roberts | G06Q 10/10 709/204 |
| 2012/0131113 | A1* | 5/2012 | Chen | G06F 21/6218 709/206 |
| 2012/0206330 | A1* | 8/2012 | Cao | G06F 3/0383 345/156 |
| 2012/0254773 | A1* | 10/2012 | Viswanathan | G06F 3/0483 715/753 |
| 2013/0091209 | A1* | 4/2013 | Bennett | H04W 4/21 709/204 |
| 2013/0091440 | A1* | 4/2013 | Kotler | G06Q 10/10 715/753 |
| 2013/0321340 | A1* | 12/2013 | Seo | G06F 1/1641 345/174 |
| 2014/0111416 | A1* | 4/2014 | Sugiura | G06F 3/0483 345/156 |
| 2014/0222916 | A1* | 8/2014 | Foley | G06Q 10/101 709/204 |
| 2014/0258901 | A1* | 9/2014 | Cho | G06F 3/04883 715/765 |
| 2014/0344053 | A1* | 11/2014 | Yang | G06F 3/0486 705/14.53 |
| 2015/0058753 | A1* | 2/2015 | Anderson | G06F 3/04812 715/753 |
| 2015/0109546 | A1* | 4/2015 | Tai | G02B 6/0036 349/12 |
| 2015/0116367 | A1* | 4/2015 | Yada | G06T 3/4092 345/661 |
| 2015/0146985 | A1* | 5/2015 | Nakasu | G06K 9/222 382/182 |
| 2015/0154442 | A1* | 6/2015 | Takahashi | G06K 9/222 345/156 |
| 2015/0248740 | A1* | 9/2015 | Gormish | G06F 3/04883 345/531 |
| 2015/0269033 | A1* | 9/2015 | Bailor | G06F 17/24 707/608 |
| 2015/0371417 | A1* | 12/2015 | Angelov | G06Q 10/101 345/442 |
| 2016/0048318 | A1* | 2/2016 | Markiewicz | G06F 3/04883 345/173 |
| 2016/0070462 | A1* | 3/2016 | Baudry | G06F 17/242 715/268 |
| 2016/0328145 | A1* | 11/2016 | Petkov | G06Q 10/101 |
| 2016/0328624 | A1* | 11/2016 | Angelov | G06Q 10/101 |
| 2017/0109578 | A1* | 4/2017 | Bednarowicz | G06K 9/00476 |
| 2018/0004407 | A1* | 1/2018 | Angelov | G06Q 10/101 |
| 2018/0203599 | A1* | 7/2018 | Angelov | G06Q 10/101 |

OTHER PUBLICATIONS

Alritten Opinion issued in corresponding Application No. PCT/CA2017/051330, dated Feb. 12, 2018 (7 pages).
Examination Notification issued in corresponding Taiwan Application No. 103107055, dated Jan. 10, 2018 (23 pages).
"Surface" Surface Pro 3 User Guide with Windows 8.1 Pro Version 1.0, Jun. 2014 (4 pages).
Extended European Search Report issued in corresponding European Application No. 16882827.5, dated Apr. 23, 2019.

* cited by examiner

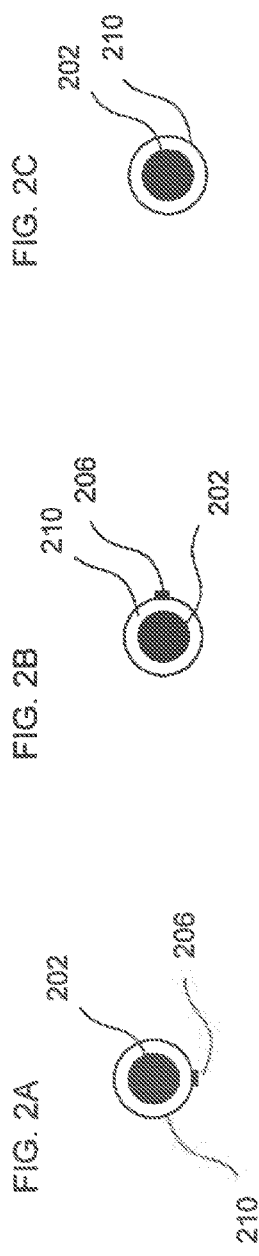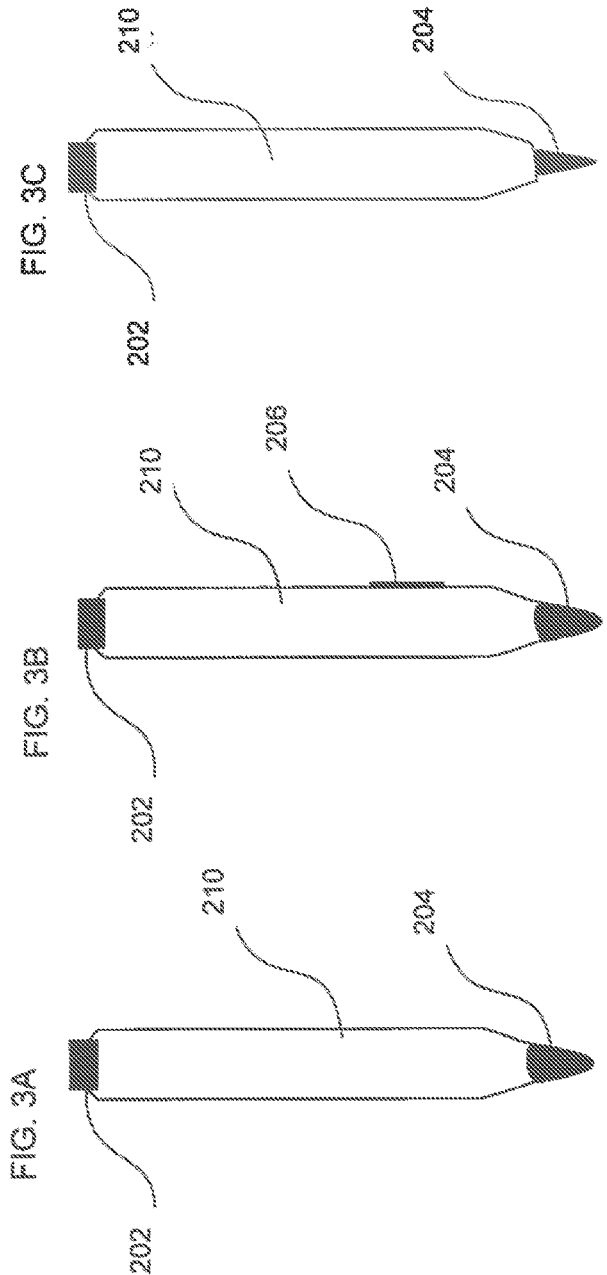

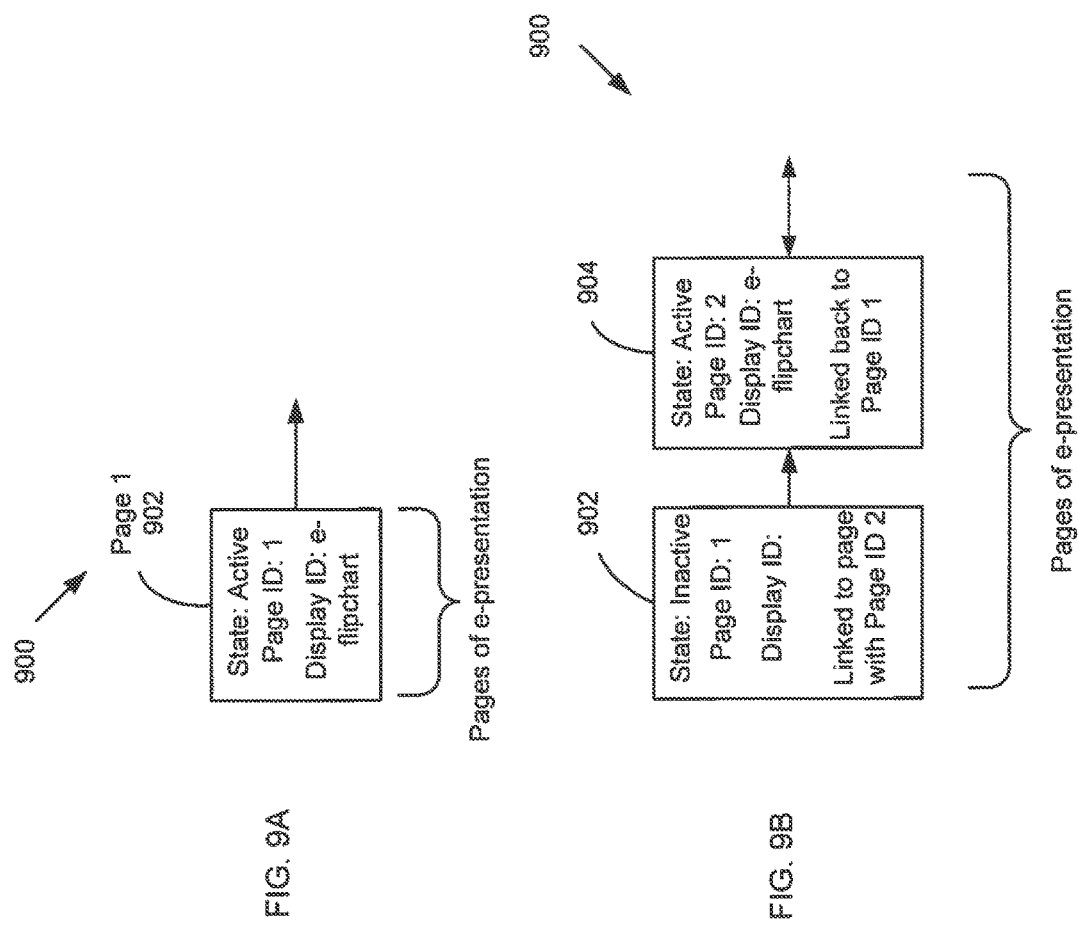

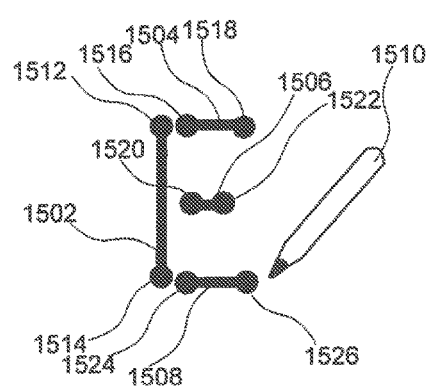 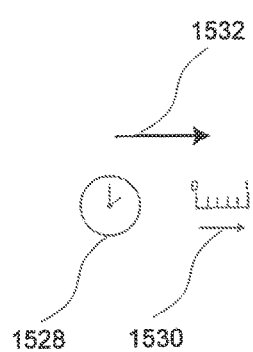 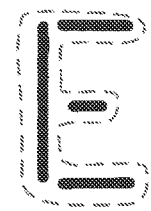
FIG. 15A (i)   FIG. 15A (ii)   FIG. 15A (iii)
FIG. 15A

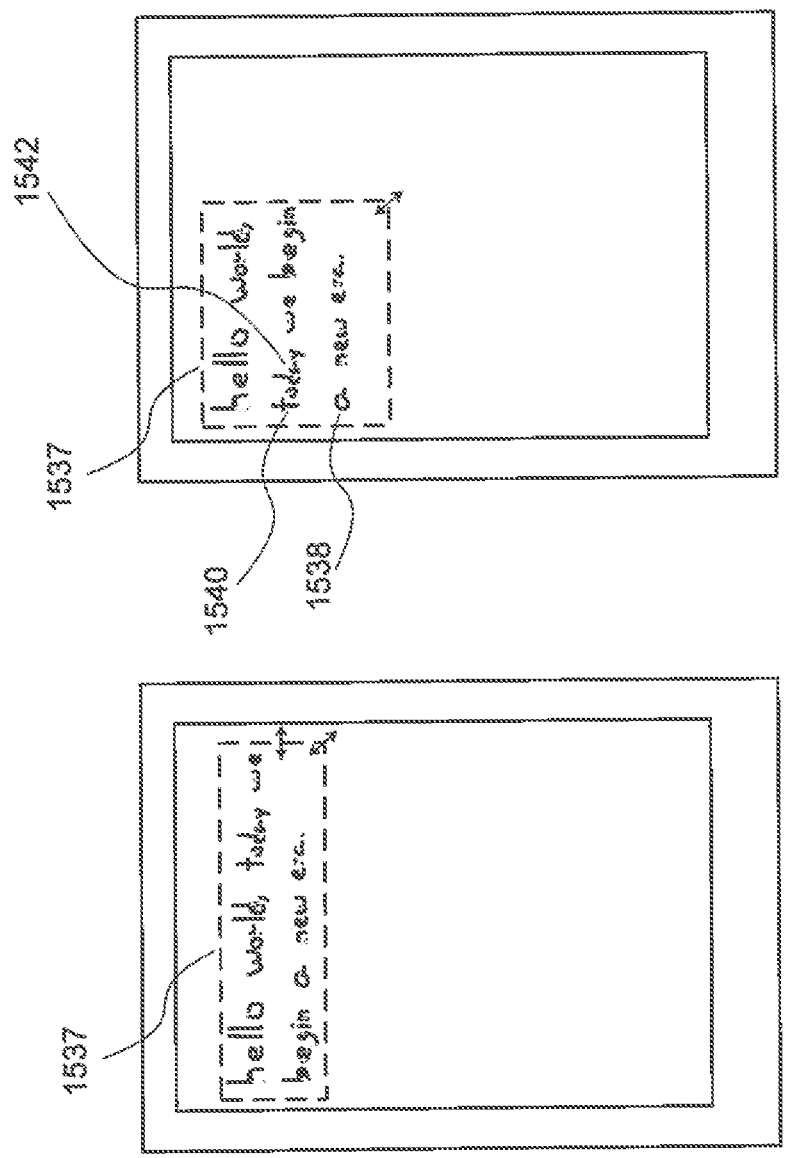

SYSTEM AND METHOD FOR FORMATTING AND MANIPULATING DIGITAL INK

CROSS-REFERENCE TO RELATED APPLICATIONS

This application claims priority to U.S. Provisional Application No. 62/275,052 filed on Jan. 5, 2016. U.S. Provisional Application No. 62/275,052 is hereby incorporated by reference in its entirety.

BACKGROUND

Flipcharts have not changed significantly over 100 years. And to this day it is very common for any meeting room to have some form of a flipchart for writing notes or sharing ideas. Use of the flipchart has been augmented by blackboards and/or whiteboards for presenting information. These tools continue to thrive in the office environment despite the introduction of digital projectors, interactive displays, laptops, and mobile phone technology. Whiteboards and flipcharts are advantageous because they are transparent to users, they are easy to set up and use, and have no technological barriers. Although technology has now advanced in the office environment, whiteboards and flipcharts are fundamentally unchanged.

SUMMARY

In general, in one aspect of the invention, the invention relates to a method for formatting data comprising detecting a stroke input, converting the stroke input into stroke data, making a determination that the stroke data should be grouped with an existing object group using a proximity threshold, based on the determination, associating the stroke data with the existing object group, and resetting a timer associated with the existing object group.

In general, in one aspect of the invention, the invention relates to a non-transitory computer readable medium, which when executed by a processor, performs a method to for formatting data comprising, detecting a stroke input; converting the stroke input into stroke data, making a determination that the stroke data should be grouped with an existing object group using a proximity threshold, based on the determination, associating the stroke data with the existing object group, and resetting a timer associated with the existing object group.

Other aspects of the invention will be apparent from the following description and the appended claims.

BRIEF DESCRIPTION OF DRAWINGS

FIGS. 2A-2C show hardware for operating an electronic flipchart in accordance with one or more embodiments.

FIGS. 3A-3C show hardware for operating an electronic flipchart in accordance with one or more embodiments.

FIG. 9A-9C show examples of storing data for an electronic flipchart in accordance with one or more embodiments.

FIGS. 15A-15E show examples of one or more of the method steps described in FIGS. 13-14, in accordance with one or more embodiments of the invention.

DETAILED DESCRIPTION

Figure 1A:
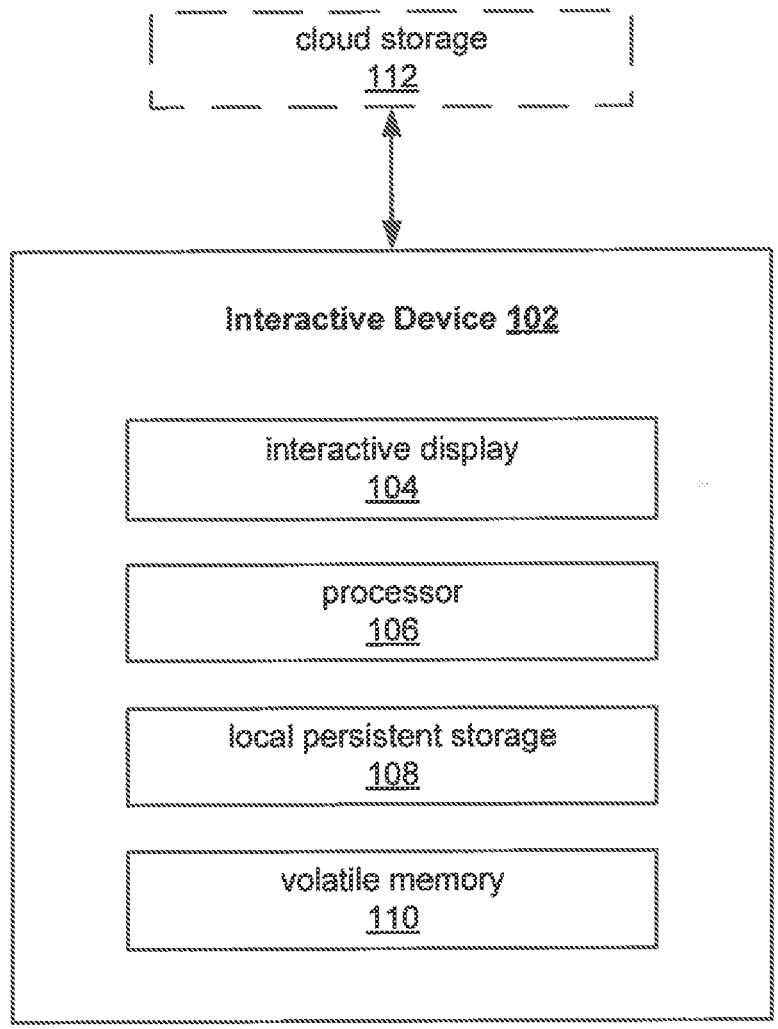
FIG. 1A shows a system in accordance with one or more embodiments of the invention.

Specific embodiments of the invention will now be described in detail with reference to the accompanying figures. Like elements in the various figures are denoted by like reference numerals for consistency. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-15, any components described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

In general, embodiments of the invention relate to a method and system for formatting data input on an interactive device. More specifically, embodiments of the invention are directed to automatically categorizing digital ink strokes, input on a touch-sensitive interactive device, into object groups, based on the time and distance of the strokes.

FIG. 1 shows a system in accordance with one or more embodiments of the invention. The system includes an interactive device (102). Each component of the interactive device (102) is described below.

In one or more embodiments of the invention, the interactive device (102) is any physical system with an interactive display (104), a processor (106), local persistent storage (108), and volatile memory (110). Further, the interactive device (102) may be operatively connected to cloud (or remote) storage (112) in a cloud computing environment. In one or more embodiments of the invention, the interactive device (102) may be any interactive device capable of receiving input, such as a reflective display device, an interactive whiteboard, an electronic tablet, or any other suitable device. For example, the interactive device (102) may be an e-flipchart apparatus as described in FIGS. 1B-10.

The interactive device (102) includes functionality to receive at least one stroke input (not shown) on the interactive display (104). The interactive device (102) also includes functionality to process, using the processor (106), the stroke input (described below) as stroke data (described below). Furthermore, the interactive device (102) is configured to categorize the stroke data based on an object type and to create object groups, using a proximity threshold and a time threshold, as further discussed below, and in accordance with the embodiments shown in FIG. 13. Additionally, the interactive device (102) is configured to store the stroke data in the volatile memory (110), local persistent storage (108), and/or cloud storage (112) associated with the interactive device (102).

In one embodiment of the invention, the interactive display (104) is a user interface with a display screen. The display screen may be a reflective Liquid Crystal Display (LCD), a bi-stable or electrophoretic display (e.g., electronic paper and/or electronic ink displays), an electrochromic display, an electro-wetting or electro-fluidic display, an interferometric modulated display (e.g., a technology that creates color via the interference of reflected light), and an electromechanical modulated display (e.g., a video projector, a flap display, a flip disk display, a digital micro-mirror device (DMD), an interferometric modulator display (IMOD), an uni-pixel display (FTIR), and a telescopic pixel display) In one or more embodiments, the interactive display (104) includes at least a touch-sensitive portion that is capable of receiving and displaying stroke input. In one or more embodiments of the invention, the stroke input, displayed by the interactive display (104), may be any digital pixel or marking made by touch input on the touch-sensitive portion of the interactive display (104), or by input on the interactive display (104) via a digital marker. For example, the stroke input may be a dot, a line, a letter, a drawing, a word, or a series of words made on the interactive display (104) using a digital marker, stylus pen, or user touch input.

As previously mentioned, in one or more embodiments of the invention, the stroke input is processed into stroke data, by the processor (106) and stored on the interactive device (102). The stroke data may be initially stored in the volatile memory (110), in accordance with the embodiments shown in FIG. 13. Volatile memory (110) may be any volatile memory including, but not limited to, Dynamic Random-Access Memory (DRAM), Synchronous DRAM, SDR SDRAM, and DDR SDRAM. Additionally, the interactive device (102) may store the stroke data in the local persistent storage (108) of the interactive device (102). Local persistent storage (108) may be, for example, solid state memory, optical storage, magnetic storage, or any other medium capable of persistently storing data. Further, the stroke data may optionally be stored on remote persistent storage or in a cloud computing environment having cloud storage (112), such as a web-based storage environment.

In one or more embodiments of the invention, the stroke data may include, but is not limited to, location data for the stroke (e.g., the x, y, coordinates of the detected locations of the stroke input), optional stroke pressure data for the stroke (e.g. the amount of pressure that was detected at each location point), stroke characteristics that can be used to render the stroke from the location data and optional pressure data (e.g. stroke line width, stroke type (e.g. pen, pencil, marker), stroke color), a timestamp associated with the stroke input, a user that produced the stroke (e.g., the user that used a stylus to draw a line on the interactive device), the type of input that was used to generate the stroke input (e.g., stylus, finger(s), etc.), information about the stylus (if a stylus was used) (e.g., the width of the tip of the stylus, etc.). In one or more embodiments of the invention, the stroke data may include the location of the pixels that are changed as a result of the stroke (e.g., the pixels that make up the line(s) and/or curve(s) that were created as a result of the stroke input), While FIG. 1A shows a configuration of components, system configurations other than those shown in FIG. 1A may be used without departing from the scope of the invention. For example, various components may be combined to create a single component. As another example, the functionality performed by a single component may be performed by two or more components.

The following section describes an e-flipchart apparatus as described in FIGS. 1B-10.

Figure 1B:
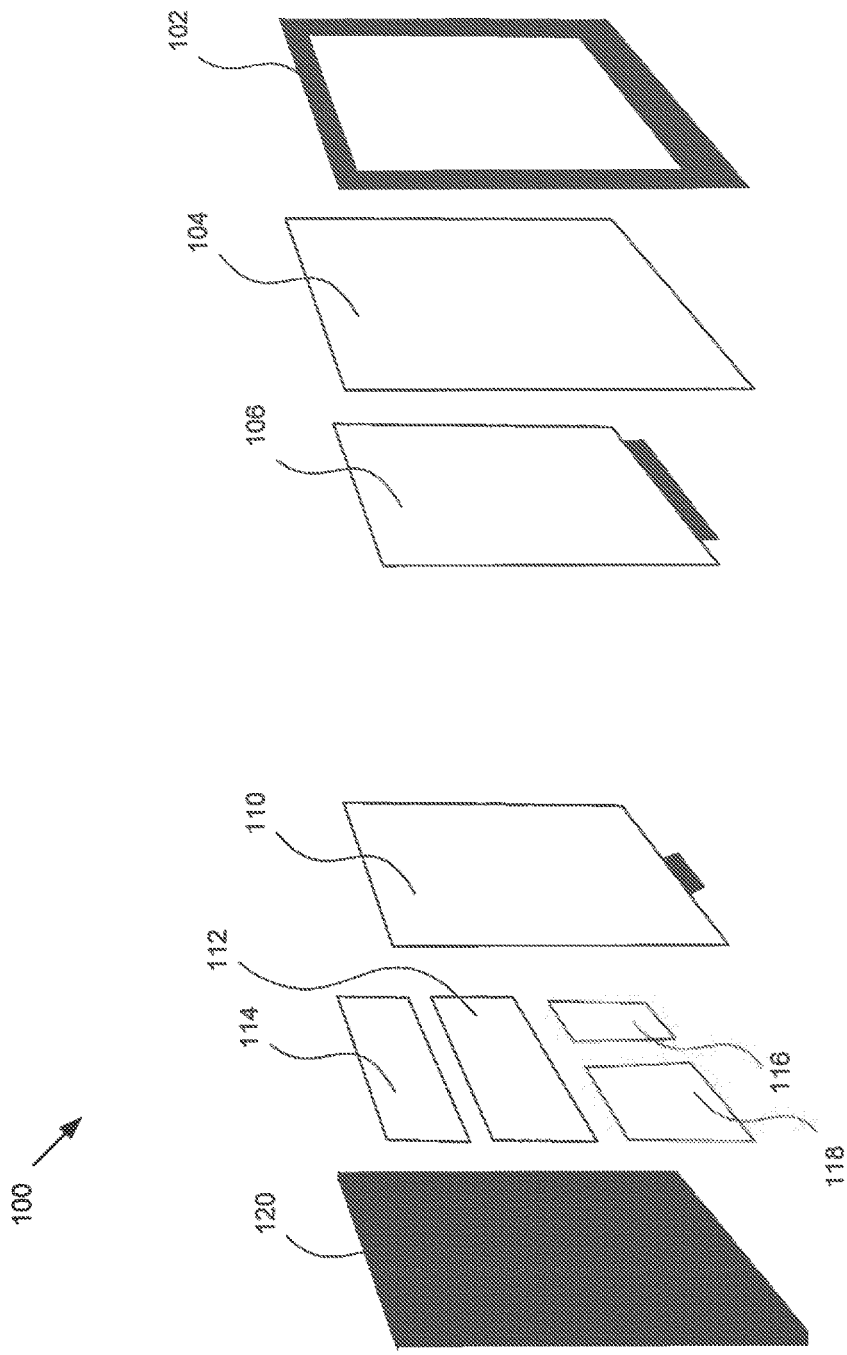
FIG. 1B shows an apparatus in accordance with one or more embodiments.

Turning to FIG. 1B, FIG. 1B shows a schematic diagram of an apparatus of an e-flipchart (also referred to as an e-flipchart apparatus) in accordance with one or more embodiments of the invention. While FIG. 1B shows a configuration of components, other configurations may be used without departing from the scope of the invention. For example, various components may be combined to create a single component. As another example, the functionality performed by a single component may be performed by two or more components.

Turning to FIG. 1B, in accordance with one or more embodiments of the invention, the apparatus (100) may include one or more hardware elements, each having specific functionality. The main structure of the e-flipchart apparatus is formed between a back panel (120) and a front frame (102). In one or more embodiments of the invention, the front frame is a clear, opaque, or translucent material and includes an active area on which content may be displayed. In one or more embodiments of the invention, the back panel (120) is a rigid mechanical support structure made of a solid material, for example, plastic or metal. In between the back panel (120) and the front frame (102) is a low-power, reflective display (106). In one embodiment of the invention, the reflective display (106) may be viewed as an output device that, through reflection, harnesses ambient light in order to present content. For example, the reflective display (106) may host slow refresh rates, monochromatic coloring (e.g., black and white, or gray scale shading), and the presentation of low contrasting definition. However, on the other hand, the reflective display (106) may have one or more of the following features: (i) very low power consumption; (ii) the readability of content outdoors under sunlight; and (iii) the providing of strain relief on the eyes of a user. As such, in one embodiment of the invention, fundamental static digital media, such as monochromatic text and still images, may be delegated to a reflective display (106) for presentation. Examples of a reflective display include, but are not limited to, a reflective Liquid Crystal Display (LCD), a bi-stable or electrophoretic display (e.g., electronic paper and/or electronic ink displays), an electrochromic display, an electro-wetting or electro-fluidic display, an interferometric modulated display (e.g., a technology that creates color via the interference of reflected light), and an electromechanical modulated display (e.g., Flap Display, digital micro-mirror device).

In one or more embodiments of the invention, at least one portion of the reflective display (106) of the e-flipchart apparatus may be bi-stable. In one embodiment of the invention, the reflective display may correspond to the reflective displayed described in U.S. Pat. No. 5,930,026. The invention is not limited to the reflective display described in the above referenced patent.

Continuing with the discussion of FIG. 1B, in front of the reflective display (106) is a layer having at least one touch portion which may be a transparent rigid or semi-rigid board (104), or a frame that uses edge sensors, such as Infra-red or optical sensing technology. In another embodiment, the layer having at least one touch portion (104) may be a capacitive film layer. In one or more embodiments, the layer having at least one touch portion (104) may only cover a portion of the reflective display, with the remaining surface area of the reflective display (106) being covered by non-touch sensitive material which may or may not be clear, opaque, translucent, transparent and/or non-transparent. In the back of the reflective display (106) is an optional electromagnetic layer, which may be an electromagnetic board (110). By combining the electromagnetic layer (110) and the layer having at least one touch portion (104), at least a dual system for touch input is obtained. In one or more embodiments, touch input may include a finger(s) and/or a touch by a digital marker or digitizer.

In one or more embodiments of the invention, the electromagnetic layer (110) is configured to generate an electromagnetic field capable of detecting a digital marker or digitizer (see e.g., FIGS. 2A-3C) when such a tool is used to provide an input to the e-flipchart. The electromagnetic layer (110) includes wires (not shown) that allow the electromagnetic layer (110) to transmit and detect input signals. In one or more embodiments of the invention, the electromagnetic board (110) is configured to determine a position of the touch input (described above) on the e-flipchart by detecting pressure or changes in the generated electromagnetic field caused by a designated portion of the touch input, for example, the tip of a digital marker and/or pressure applied by one or more fingers.

In one or more embodiments of the invention, the front frame (102) includes an active area or region with an active display, and an active input method that includes at least two input capabilities: the ability to detect a digital marker or digitizer and the ability to accept touch input from one or more finger touch points. Further, the apparatus (100) is configured to respond to each detected input type (see e.g., FIG. 6). For example, detecting a digital marker input may result in a line being drawn on the reflective display, while touching the same area with a finger may pan or zoom the display area.

Continuing with FIG. 1B, controller (114) includes hardware and software/firmware to control the overall operation of the e-flipchart. More specifically, the controller (114) may include one or more processors (CPUs), persistent storage, and/or volatile memory. Persistent storage may include, for example, magnetic storage, optical storage, solid state storage (e.g., NAND Flash, NOR Flash, etc.), or any combination thereof. Volatile memory may include RAM, DRAM, or any combination thereof. In one or more embodiments of the invention, all or a portion of the persistent storage and/or volatile memory may be removable. In one or more embodiments, the persistent storage may include software instructions for executing operations of the e-flipchart. Specifically, the persistent storage may be configured to store software and/or firmware specific to e-flipchart operations. In one or more embodiments of the invention, the built-in CPU/processors of the controller (114) may execute an operating system and the software which implements e-flipchart functionality.

The controller (including components therein) (114) is powered by a battery and/or a power supply (112). In one or more embodiments, controller (114) is configured to detect and process input signals. For example, when an object touches the layer having at least one touch portion (104), a signal is sent to the controller (114) for detection of the input type and processing of the input. Further, the controller is configured to store e.g., in persistent storage and/or volatile memory, each stroke (in the form of touch input or digital marker) after such an action is performed on the e-flipchart (100) (see e.g., FIG. 6). In other words, the controller (114) is configured to store each stroke or action as it is produced in the active area of the front frame (102) of the e-flipchart apparatus (100). In one or more embodiments of the invention, the controller (114) includes functionality to implement the methods shown and described in FIGS. 6-8. Further, while the controller (114) has been described as a combination of hardware and software, the controller may be implemented entirely within hardware without departing from the scope of the invention.

In one embodiment of the invention, the e-flipchart may include one or more external communication interfaces (116). The communication interfaces permit the e-flipchart to interface with external components. The communication interfaces may implement any communication protocol, for example, Bluetooth, IEEE 802.11, USB, etc. The invention is not limited to the aforementioned communication protocols.

In one or more embodiments of the invention, the apparatus (100) of FIG. 1B is a lower-power reflective device that only draws power from the battery/power supply (112) when there is a screen refresh with new information displayed or when a user is drawing or inputting information in the apparatus. In other words, while the apparatus (100) is "always on" and in a mode that is ready to detect an input, the apparatus is in a low power state. When an input is detected by the apparatus (100) on the active area of the front frame (102), the e-flipchart apparatus is configured to change from the low power state to an active state and perform the methods described in FIGS. 6 and 8.

In one or more embodiments of the invention, the e-flipchart apparatus may be deemed to be in an active state when some or all the components on the e-flipchart apparatus are working accepting pen, touch, keyboard and LAN input, processing applications and/or saving data (and/or metadata) to memory. In the active state, the components of the e-flipchart apparatus are drawing energy from the controller (114). In contrast, the e-flipchart apparatus may be deemed to be in a low power state, (or ready-mode) when no pen, touch, keyboard or LAN inputs are detected (for at least a pre-determined period of time), but the apparatus still shows the last content displayed on it (or displays no content). In ready-mode, CPU processes are minimized, scan rate of finger and pen inputs are delayed and overall power consumption of the components in the e-flipchart apparatus are reduced, for example, by at least 50%. Power consumption may be reduced by a different amount without departing from the invention. For example, only the battery and the controller may be drawing power in ready-mode, reducing the overall power consumption of the e-flipchart apparatus to 40% relative to the power consumption of the e-flipchart apparatus when it is in the active mode. The management of the amount of power that is provided to components of the e-flipchart apparatus and the frequency of polling for input is performed by the controller (114). Specifically, the controller (114) may include an energy management process configured to control the state of various components of the e-flipchart apparatus based on whether the e-flipchart apparatus is in ready-mode or in the active mode.

To contrast the two states of the e-flipchart apparatus, in one or more embodiments of the invention, when the reflective display is in ready-mode, the polling for input occurs at a low frequency, for example, the apparatus may scan for input 2-10 times per second. However, once an input is detected by the apparatus, the apparatus may transition to an active state and increase polling to a higher frequency, e.g., 60-120 times per second, in order to capture all the input that may be occurring on the reflective display. Other polling frequencies may be used in the active state and/or in the ready-mode without departing from the invention.

In one embodiment of the invention, the term "low power state" is intended to convey that the power consumption of the e-flipchart apparatus in this state is relatively lower (or less) than the power consumption of the e-flipchart apparatus in the active state.

Though not shown in FIG. 1B, the e-flipchart apparatus may include a camera for detecting certain types of input, e.g., a gesture interpretation.

In one or more embodiments of the invention, the e-flipchart is configured to enable a user to create, modify, store, and share an e-presentation. An e-presentation is described below in FIG. 4.

In one or more embodiments of the invention, the apparatus (100) of FIG. 1B is approximately 42 inches in diagonal with a 3:4 aspect ratio. Those skilled in the art will appreciate that the size of the e-flipchart apparatus is designed to mimic that of a typical paper flipchart; however, the dimensions and size of the reflective display apparatus of FIG. 1B may vary without departing from the scope of the invention. For example, additional dimensions may include 32" 4:3 aspect ratio for a personal sized flip chart, and 55" or 60" for larger collaborative surfaces. Even larger surfaces may vary the aspect ratio to allow for more usable width, without adding unusable height, such as a 9:16 ratio for an 80" diagonal size.

While FIG. 1B describes an e-flipchart with a series of components organized in particular manner, those skilled in the art will appreciate that the location of such various components in the e-flipchart, in particular, the reflective display (106), the layer having at least one touch portion (104), and the optional electromagnetic layer (110) may be arranged in different order without departing from the invention.

FIGS. 2A-2C shows the hardware for the digital marker or digitizer that may be used as one type of input capable of being detected by the e-flipchart apparatus described in FIG. 1B above. Specifically, FIGS. 2A-2C show a top view of the digital marker in the form of a cylinder (210). The top of the digital marker has an electronic eraser (202) and at least one button (206). In one or more embodiments of the invention, the button (206) is software programmable and, when pressed or otherwise activated, is configured to send one or more signals to the e-flipchart. For example, when the button (206) is pressed or otherwise activated, the button (206) may send a wireless signal that is detected by the e-flipchart. Those skilled in the art will appreciate that the button (206) may be hidden or built into the electronic eraser (202). Further, although only one button is shown in FIG. 2A-2C, the digital marker may include more than one button, where each button is separately programmable. In one or more embodiments, when the electronic eraser (202) comes into contact with the e-flipchart, the e-flipchart is configured to remove or otherwise clear content from the corresponding locations on the reflective display. Said another way, the electronic eraser (202) mimics the operation of a traditional eraser.

FIG. 2B shows a different orientation (i.e., a side view with a zero degree rotation of the cylinder) of the digital marker or digitizer, in which the button (206) is located at the side of the electronic eraser (202) rather than at the bottom of the electronic eraser (202). FIG. 2C shows another top view of the digital marker, in which the cylinder is rotated 90 degrees. In FIG. 2C, the button (not shown) is hidden from view.

FIGS. 3A-3C depict side views of the digital marker or digitizer in accordance with one or more embodiments of the invention. In FIGS. 3A-3C, the entire length of the cylinder (210) form of the digital marker can be seen. In FIG. 3A, on a top end of the digital marker, the electronic eraser (202) is shown. In addition, the tip (204) of the digital marker or digitizer is shown on a bottom end of the cylinder (210). The tip (204) material may be selected such that the tip (204) slides easily over the writing surface. Materials for the tip (204) may include, but are not limited to, high density polyoxyethylene, hard felt, elastomer, polyoxymethylene, polyacetal, or polyoxyethylene. Other materials may be used without departing from the invention.

In one or more embodiments of the invention, the tip (204) of the digital marker may be used to draw or write directly on the active area of the front frame (102) of the e-flipchart apparatus. In FIG. 3B, the button (206) is shown on a side of the cylinder (210) of the digital marker. In FIG. 3C, the tip (204) of the digital marker is shown as being thinner and sharper in comparison with the tip of FIGS. 3A-3B. Those of ordinary skill in the art will appreciate that the tip (204) of the digital marker is a hardware component that may be interchangeable and designed to mimic a pencil, pen, marker, stylus, or any other suitable writing tool having varying widths and sharpness. In FIG. 3C, the button is not shown.

While FIG. 3A-3C show a cylinder shape for the digital marker, those skilled in the art will appreciate that the shape of the digital markers may take other forms without departing from the scope of the invention.

As described above, users of the e-flipchart are able to create, display, store, modify, and share e-presentations. Each e-presentation includes one or more pages organized in a sequential manner. The controller includes functionality to store the information necessary to maintain the e-presentation and allow the user to interact with the e-presentation as described below. An exemplary e-presentation is shown in FIG. 4.

Figure 4:
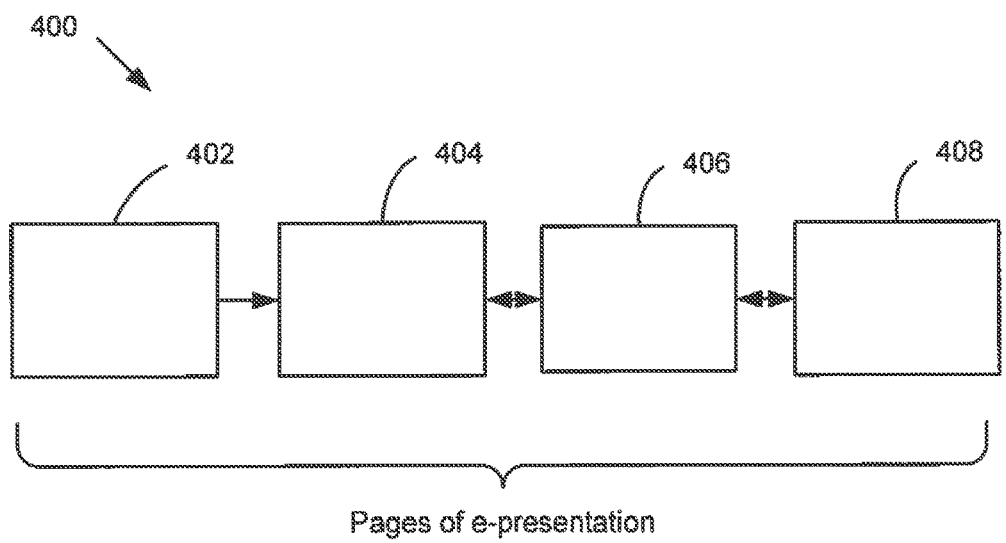
FIG. 4 shows a data structure for an electronic flipchart in accordance with one or more embodiments.

FIG. 4 shows an e-presentation (400) in accordance with one or more embodiments of the invention. The e-presentation may include one or more pages (402, 404, 406 408), where each page represents an electronic page of the e-flipchart. Each page of the e-presentation (400) corresponds to content that may be displayed on the e-flipchart apparatus. In one or more embodiments of the invention, the e-presentation (400) shown in FIG. 4 may be stored in memory or persistent storage associated with the e-flipchart apparatus or in a cloud computing environment to which the e-presentation is backed-up, or any combination thereof. For example, the e-presentation may be stored in persistent storage locally, and mirrored in the cloud environment.

In one or more embodiments of the invention, the e-pages (402, 404, 406, 408) are linked as the e-presentation is populated, in real-time. The link between the pages is represented by the bi-directional arrows shown in FIG. 4. Specifically, the link between pages of the e-presentation and the metadata stored to track the various information associated with the e-presentation is shown in FIG. 5.

Figure 5:
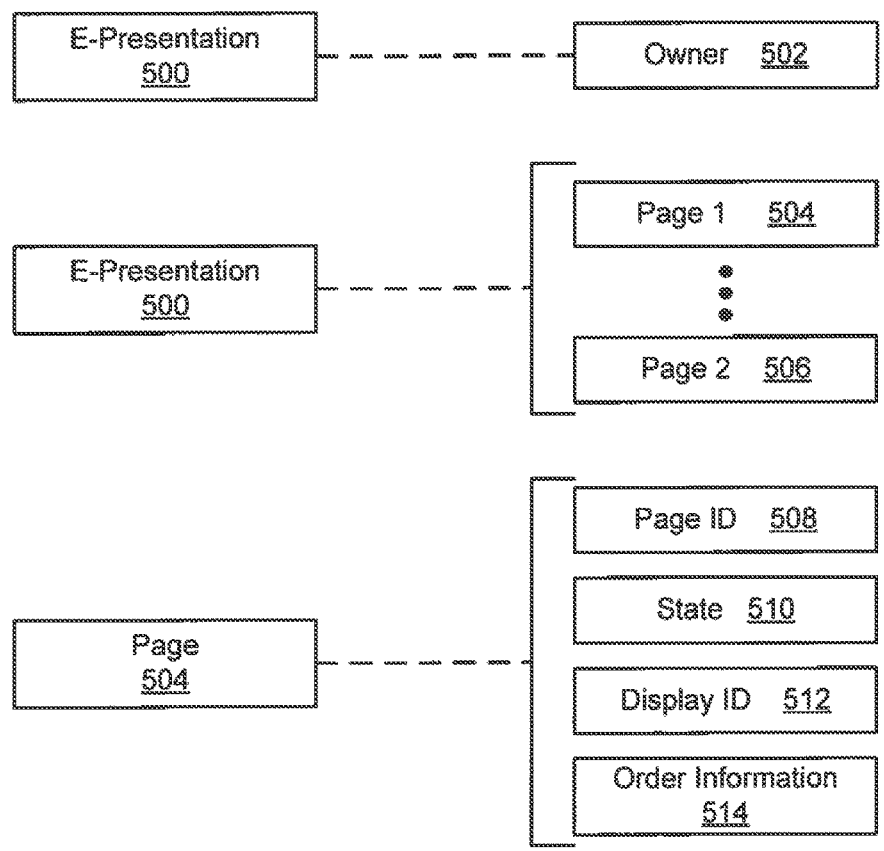
FIG. 5 shows data relationships for an electronic flipchart in accordance with one or more embodiments.

Specifically, in FIG. 5, each e-presentation (500) may be associated with an optional owner (502). In one or more embodiments of the invention, the owner (502) may be the entity or device on which the e-presentation is initially created. In this case, the owner (502) may be represented by a device ID which identifies the device on which the e-presentation is created. For example, when the e-presentation (500) is created on the e-flipchart apparatus, the owner (502) field may be populated with the local ID of the e-flipchart. Alternatively, the owner (502) may be an individual or group of individuals. In this case, the owner (502) may be represented by one or more user IDs. In one or more embodiments, although not shown, an e-presentation may also have permissions associated with the presentation as a whole, or each page of the e-presentation. Specifically, permissions to read/view/edit an e-presentation may be given by the owner (502) of the e-presentation (500), or by a user of the e-flipchart or other device that is specified as the owner of the e-presentation.

In addition, as shown in FIG. 4 above, the e-presentation (500) may be composed of one or more pages (e.g., Page 1 (504), Page N (506)). Each page (504, 506) is in turn associated with content (data) and metadata. For example, as shown in FIG. 5, page (504) has a page ID (508), a state (510), a display ID (512), and order information (514). The page ID (508) uniquely identifies that page in the e-presentation. The page ID (508) may be numerical, alphabetical, symbolic, or any combination thereof. In one embodiment of the invention, each page may be associated with a state (510). In such embodiments, the state (510) of the page (504) may be, but is not limited to, an active or an inactive state. An active state indicates that page (504) is currently displayed or being written to via the e-flipchart or via another device (see e.g., FIG. 10). An inactive state indicates that page (504) is part of the e-presentation but is not the page that is currently displayed (i.e., the page is not shown) or being written to. Those skilled in the art will appreciate that a page may be associated with other states without departing from the scope of the invention, such as for example, an edit state in which the page is being edited offline, or an offline state in which the page is linked to the e-presentation but is offline or stored in persistent memory.

In one embodiment of the invention, each page may be associated with a display ID (512). In such embodiments, the display ID (512) associates the page (504) with a display device. For example, in a scenario in which the page (504) is displayed on the e-flipchart, the display ID may be the ID of the e-flipchart. In an alternate embodiment, suppose page (504) is linked to an e-presentation currently being modified on the e-flipchart, but is not the active page of the e-presentation. In this case, the page (504) may be shared with second device over a network, so that the owner of the second device may edit the page (504) (see e.g., FIGS. 9A-9C, 10). In this scenario, the display ID (512) associated with the page (504) is the ID of the second device on which the page (504) is being edited. Accordingly, the display ID (512) of a page (504) linked to an e-presentation may change at any time. In one or more embodiments, there may be multiple display IDs (512), each one corresponding to a device that is currently viewing the page (504). Further, in one or more embodiments, the display ID may only be assigned when the state of a page is active. When the state of page is inactive, the display ID field in the data structure of the e-presentation may be null.

In one or more embodiments of the invention, the order information (514) of a page (504) links the page (504) to other pages in the e-presentation in a specific order and indicates how the pages of an e-presentation may be traversed. Specifically, the e-flipchart apparatus mimics use of a typical paper flipchart apparatus, in which a new page is obtained by flipping a current page over the flipchart apparatus. In the typical flipchart apparatus, the pages are flipped in an order, such that pages cannot be skipped to obtain a particular page of the e-presentation. Similarly, with the e-flipchart apparatus, each page (504) of the e-presentation may be linked to at least one page prior to the page (504) and at least one page following the page (504) in the e-presentation. In one or more embodiments of the invention, the order information (514) may include the page IDs of at least the page prior to the page (504) and the page following the page (504). Those skilled in the art will appreciate that the controller may facilitate skipping to a page out of order without departing from the scope of the invention.

In one or more embodiments of the invention, the metadata associated with an e-presentation, as shown in FIG. 5, may be populated and stored into a data structure as the e-presentation is created and modified. The data structure may then be stored locally in the e-flipchart apparatus persistent storage, or in a cloud computing environment. A specific example of how the data structure is populated is described in FIG. 8 below.

Figure 6:
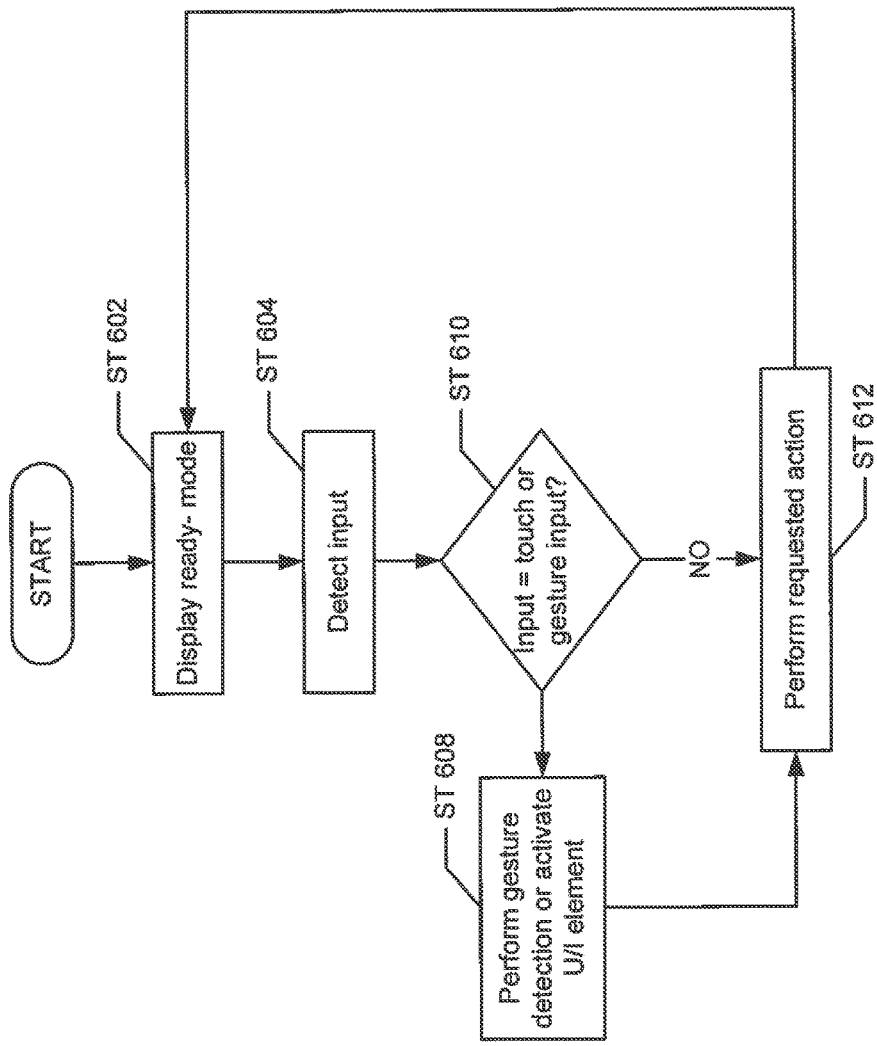
FIG. 6 shows a flowchart in accordance with one or more embodiments.

FIG. 6 shows a flow chart in accordance with one or more embodiments of the invention. While the various steps in this flowchart are presented and described sequentially, one of ordinary skill, having benefit of this disclosure, will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention.

In Step 602, the e-flipchart apparatus is in display ready-mode. As described above, the e-flipchart apparatus may be always "on," and therefore, ready for use when a user walks up to the apparatus or provides another type of input that is detected by the apparatus (Step 604). Specifically, in the ready-mode (or base state), the e-flipchart apparatus polls for an input at a low frequency or input scan rate. In this mode, the display area of the e-flipchart apparatus may include the image from the last time it was fully active. When an input is detected, the apparatus changes state from ready-mode to the active state. For example, in one or more embodiments of the invention, when input is sensed by the electromagnetic board, a signal is sent to a controller CPU which is running the energy management software to "wake up" some or all the components and put them in "active mode". The same process occurs when a signal is detected via a GUI, touch input, or in a "wake up on LAN" input.

The input detected by the e-flipchart apparatus in Step 604 may be a wireless input provided by the press of a button, such as a Bluetooth signal, radio frequency signal, or other wireless network signal, a digital marker input, a touch input, a gesture input, or any other suitable type of input. Based on the type of input detected, a specific action may be performed by the e-flipchart apparatus. Thus, upon detection of an input, a determination is made as to whether the input is a touch input or a gesture input (Step 606). If the detected input is a user gesture, the e-flipchart apparatus may be configured to perform gesture detection or activate a user interface (UI) component (Step 608). For all other input types, an appropriate action is performed by the e-flipchart apparatus (Step 610). For example, when the detected input is not a touch or gesture input, but rather, is a wireless signal, for example, a press of the button on the digital marker, corresponding external events may be activated (Step 610). For example, in Step 610, when the input is a Bluetooth signal, the e-flipchart apparatus may be configured to activate a peripheral device or external Bluetooth receiver. External event inputs may also be, in one or more embodiments of the invention, proximity sensors, motion sensors, sound sensors that detect sound above a particular decibel threshold, etc., for detecting the presence of one or more people close to or in the vicinity of the e-flipchart apparatus. For example, proximity sensors may include ultrasonic sensors or infrared sensors. In yet another embodiment of the invention, when the detected input is a pen stroke using a digital marker or digitizer, the e-flipchart apparatus may be configured to detect the path of the digital marker tip and convert the motion to a display of simulated ink strokes (Step 612). Accordingly, the specific action performed by the e-flipchart may vary depending on the type of input received.

When the detection input is a gesture or a touch input, the activated components may display data on the display area, flip a page, zoom into the content displayed, or perform any other suitable action in response to the touch/gesture input. In one or more embodiments of the invention, after performing the action in response to the detection of an input, the e-flipchart apparatus returns to the base state of "ready-mode." In one or more embodiments, in this mode the e-flipchart apparatus to continue to display an image without any power used by the bi-stable reflective display component of the apparatus. Examples of the types of actions that may be performed are described below in FIGS. 7A-7E.

Figure 7C:
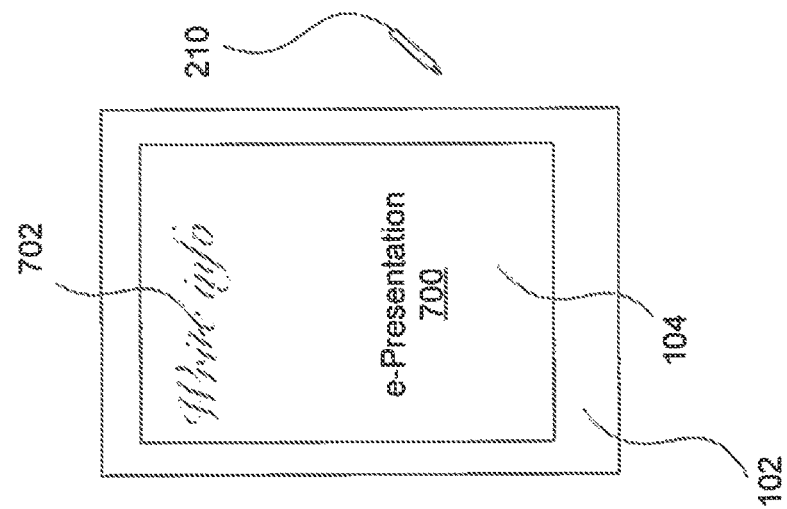
FIG. 7A-7F show examples of an electronic flipchart in accordance with one or more embodiments.
Figure 7B:
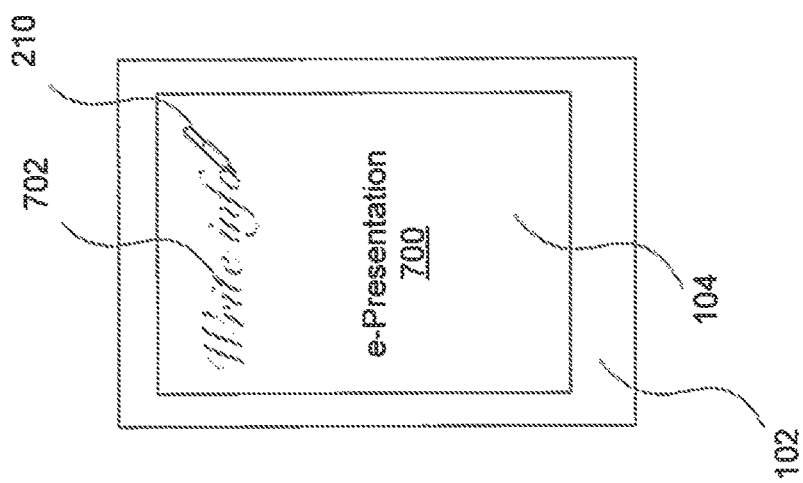
Figure 7A:
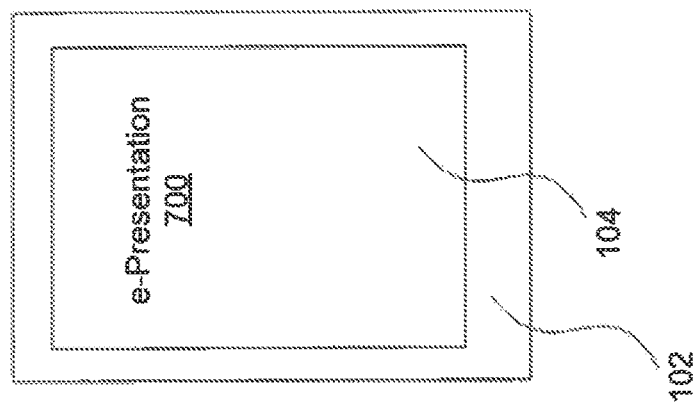

Specifically, in one or more embodiments of the invention, FIG. 7A shows an example front frame (102) of an e-flipchart apparatus. The front frame (102) mimics a screen and has an area which is capable of accepting at least two type of input: touch and digital marker. When one of the aforementioned types of input is detected, for example in the active region or display area of the layer having at least one touch portion (104), an e-presentation (700) is created and displayed. Specifically, when a user walks up to the e-flipchart apparatus in ready-mode and provides an input, the e-presentation (700) is created. Creation of the e-presentation may include generating and populating the data and metadata shown in FIG. 5. In FIG. 7A, the display area is blank. In FIG. 7B, an example input of writing (702) using a digital marker (210) on the active area of the e-flipchart apparatus is shown. Specifically, in FIG. 7B, when the tip of the digital marker or digitizer (210) is pressed onto the active area of the e-flipchart apparatus, the path of the digital marker (210) is detected and converted by the software of the e-flipchart apparatus into simulated ink strokes (702) which are displayed on a first page of the e-presentation (700). FIG. 7C shows at least one embodiment in which the displayed stroke images are maintained on the e-flipchart apparatus without any power consumption by the reflective display component of the e-flipchart apparatus. In one or more embodiments of the invention, the reflective display displays the latest information that resulted from input to the e-flipchart, and does not change until new input is received by the controller.

Figure 7E:
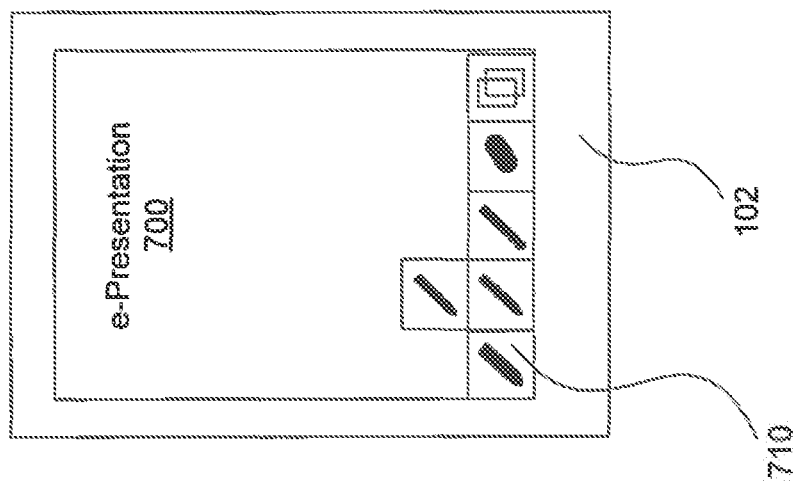
Figure 7D:
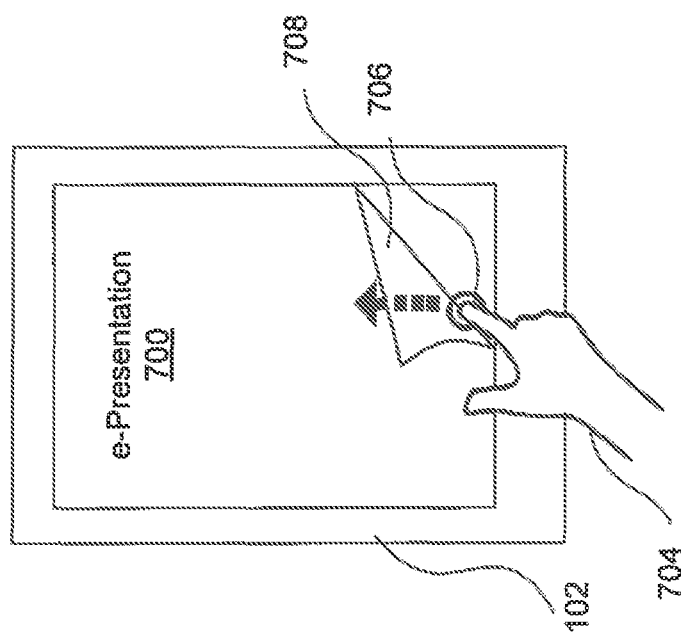

In FIG. 7D, a touch input (704) is detected by the e-flipchart apparatus. In the example shown, a user touches the display screen (706) and, in one or more embodiments, moves his/her finger in an upward motion (indicated by the arrow pointed upward), resulting in the current page (708) flipping over to begin a new page of the e-presentation (700). Those skilled in the art will appreciate that a page may be flipped using a gesture input as well, in addition to or instead of a touch display as shown in the example of FIG. 7D. For example, a visual gesture (e.g., movement of a hand in a particular path without touching the e-flipchart) which may be detected by the camera and that is interpreted as a page flip may result in the software interpreting the flip gesture as a page flip action. A page flip action results in transitioning from a current page to another page of the e-presentation. In FIG. 7E, a graphical user interface (GUI) (710) is displayed on the screen of the e-flipchart apparatus. The GUI (710) may be invoked by the pressing of a button on the digital marker, by a gesture, or by any other designated input. In one or more embodiments of the invention, the GUI (710) may be invoked from a menu on a secondary screen that is, for example, connected to a cloud server by a bi-directional communication channel. In one or more embodiments, the GUI (710) may be used to select particular features or perform selected actions such as, for example, sharing the current page of an e-presentation, selecting an eraser, changing the font, style, or color of the displayed line strokes, etc.

Figure 7F:
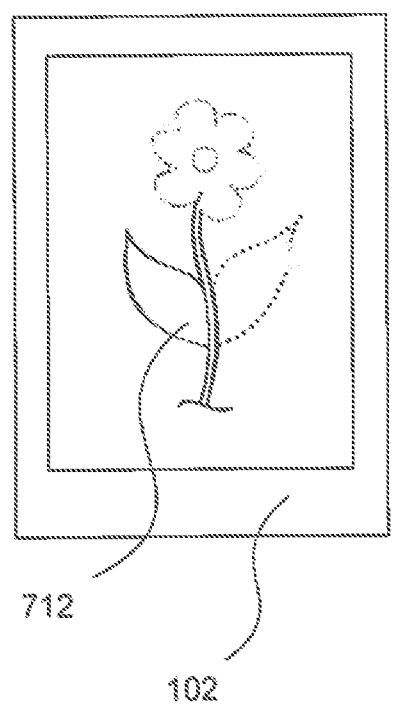

FIG. 7F shows an example of an e-presentation having a drawing. In one or more embodiments of the invention, as shown in FIG. 7F, the e-flipchart apparatus may display a pencil skeleton image (712) to aid a user in creating an e-presentation. The pencil skeleton may provide a light image so that a user may, at a later time, trace the light pencil drawing with a marker to draw a predetermined object. This feature may be used, for example, to create an illusion that the user is creating artwork on the fly. Although FIG. 7F shows a pencil skeleton of a flower, those of ordinary skill would appreciate that the pencil skeleton may depict any object, or may more generally provide any type of aid for writing or drawing. For example, the pencil skeleton may be a combination of light horizontal and vertical lines mimicking graph paper or notebook paper.

Figure 8:
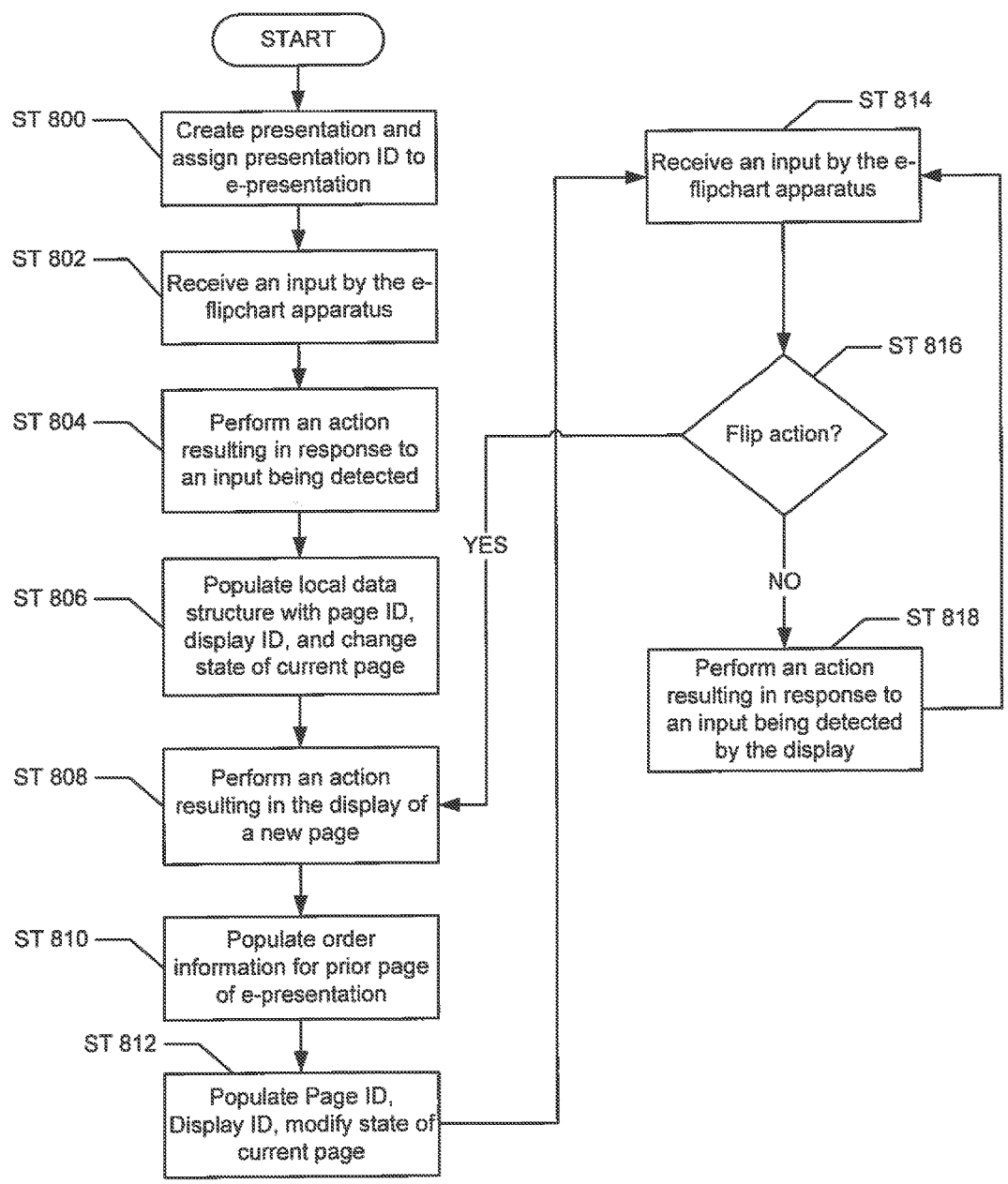
FIG. 8 shows a flowchart in accordance with one or more embodiments.

FIG. 8 shows a flow chart in accordance with one or more embodiments of the invention. Specifically, FIG. 8 shows a flowchart for creating and maintaining an e-presentation in accordance with one or more embodiments of the invention. While the various steps in this flowchart are presented and described sequentially, one of ordinary skill, having benefit of this disclosure, will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

In step 800, an e-presentation is created and associated with a presentation ID. In one or more embodiments of the invention, the presentation ID may be assigned by an e-presentation server, or alternatively, may be generated by the e-flipchart or provided in response to an input prompt to the user. The e-presentation server may be a remote server that is connected to the e-flipchart apparatus via a network. The functionality and purpose of the e-presentation server is described below in FIG. 10. The presentation ID may be a numerical ID, alphabetical ID, a symbolic ID, or any combination thereof, and is configured to uniquely identify the e-presentation displayed on the e-flipchart apparatus. When an e-presentation is initially created, it may not contain any content. Further, if the e-flipchart apparatus does not receive any user input within a certain period of time, the e-flipchart apparatus may transition to ready-mode. In one embodiment of the invention, step 800 may be performed when the e-flipchart apparatus is in either ready mode or active mode.

In Step 802, an input is detected by the e-flipchart apparatus in ready-mode. In ready-mode, the apparatus is scanning for input at a low frequency, e.g., twice per second. As described above, the input detected by the reflective display may be a touch input, a digital marker input, a proximity sensor input (e.g., when a user approaches the e-flipchart apparatus), a network signal, or any other suitable type of input. As described above, when an input is detected, the apparatus changes state from ready-mode to the active state. For example, in one or more embodiments of the invention, when input is sensed by the electromagnetic board, a signal is sent to the controller CPU which is running the energy management software to "wake up" some or all the components and put them in "active mode". The same process occurs when a signal is detected via a GUI, touch input, or in a "wake up on LAN" input. Step 802 may also be performed when the e-flipchart apparatus is in active mode.

In step 804, an action is performed in response to the received input. For example, the corresponding action may be to activate one or more components of the e-flipchart apparatus, convert input strokes to display rendered stroke images, display a GUI, share information with another device, etc. In one or more embodiments of the invention, when the input is received via a digital marker on the surface of the apparatus, the apparatus may identify a tip width of the digital marker via various methods. For example, the electromagnetic board may detect the tip width of the digital marker. Alternatively, the layer having at least one touch portion may be configured to detect the tip width of the digital marker. In yet another embodiment, the digital marker may transmit a signal to the apparatus that includes information about the tip width. In one or more embodiments of the invention, using information about the tip width associated with the input received, the apparatus may be configured to display a certain line width for rendered strokes.

In Step 806, a data structure (shown in FIG. 5, for example) for storing metadata associated with the e-presentation is populated with a page ID and a display ID. In addition, the state of the current page with the page ID is changed to active. In one or more embodiments of the invention, the data structure may be populated and stored locally, in the memory associated with the e-flipchart apparatus, or may be stored remotely, for example, in an e-presentation server or cloud computing environment. If the data structure is stored locally, the data structure may be backed-up (e.g., mirrored) on a remote server or in the cloud computing environment. At this stage, various actions may be performed resulting in writing or drawing on the current page. In step 808 an input resulting in display of a new page may be detected. For example, a touch input or gesture which results in a page flip.

In step 810, when a second page is created as part of the e-presentation, the data structure is populated with order information, linking the first page to the new second page in the e-presentation. In step 812, the new page of the e-presentation may be assigned its own page ID, following that of the first page ID, and display ID. In addition, the state of the first page is changed to inactive, and the state of the current page, i.e., the second page, is changed to active. In step 814, input is received by the e-flipchart apparatus.

In step 816, a determination is made as to whether the input received in Step 814 is a page flip action. If a page flip action is detected, the method proceeds to Step 808 and the data structure continues to populate itself with a third page ID and ordering information for the second page is updated to reflect the link to the third page. This process may repeat each time a page flip action is detected by the e-flipchart apparatus. Alternatively, if no page flip action is detected, then the process proceeds to step 818. In step 818, an action corresponding to the input received is performed. In one embodiment of the invention, the process may not end (i.e., various steps in FIG. 8 may be repeated), because the e-flipchart apparatus does not turn "off." Rather, when input is not detected for a predetermined amount of time, the e-flipchart apparatus returns to "ready-mode" and waits for an input (Step 814).

Figure 9C:
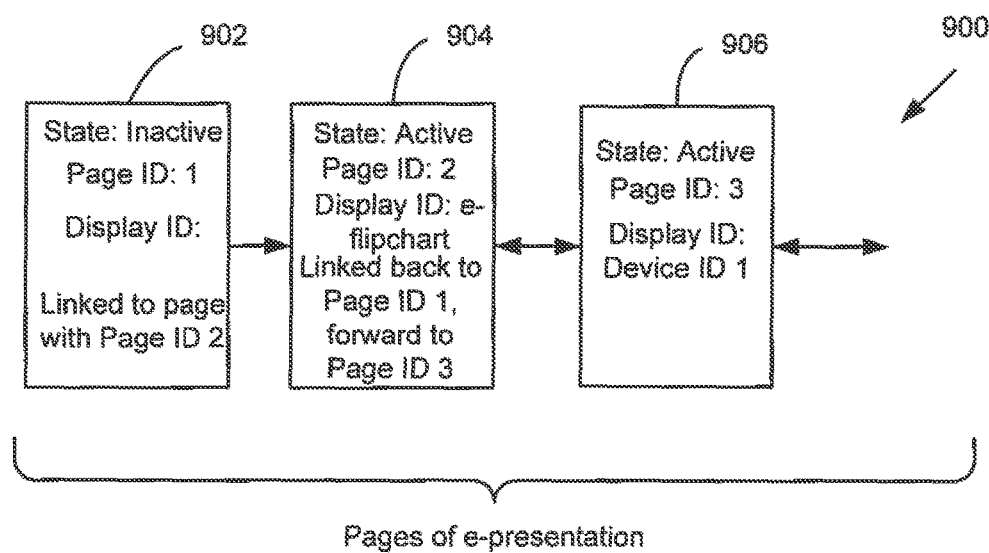

FIGS. 9A-9E show examples of the method described in FIG. 8 above in accordance with one or more embodiments of the invention. In FIG. 9A, consider a scenario in which an e-presentation is created by the e-flipchart apparatus. At some point after the e-presentation is created, assume that a user walks up to the e-flipchart apparatus and provides an input in the form of pressing a button on or writing with a digital marker. Once the input is detected, the action associated with the input is interpreted and, in this example, result in content being associated with the first page (902) of the e-presentation. The first page (902) (i.e., the page on which characters are written, for example) is displayed on the active area of the e-flipchart apparatus with a white background. At this stage, the data structure (900) which stores metadata associated with the e-presentation begins to be populated with metadata. As shown in FIG. 9A, the metadata associated with page 1 (902) includes the state of active, a page ID of 1, and a display ID that identifies the e-flipchart apparatus. The owner ID of the e-presentation may also be the ID of the e-flipchart apparatus, or may be null for purposes of this example. Those skilled in the art will appreciate that no order information exists for a single page e-presentation.

Now suppose the user gestures or provides a touch input which the software of the e-flipchart apparatus interprets as a page flip action. As shown in FIG. 9B, a second page is added to the e-presentation, and the metadata for both page 1 (902) and page 2 (904) is updated/populated in the data structure (900). Specifically, the state of page 1 (902) becomes inactive as it is no longer the page that is displayed. Further, the display ID field of page 1 (902) is updated to null. Order information is added to page 1 (902) linking the page to the second page (904) in order. For page 2 (904), an active state is retained, a new page ID is assigned and the display ID is updated to be the ID of the e-flipchart apparatus. Order information for page 2 (904) is populated to reflect that page 2 (904) is linked to page 1 (902). More specifically, page 2 (904) comes after page 1 (904). The order information becomes important when a page flip action is performed. Specifically, during normal operation, because the e-flipchart apparatus mimics a traditional paper flipchart, pages must be flipped in order (i.e., when using the page flip action, one cannot jump from page 1 to page 4, for example, without also flipping pages 2 and 3, although pages may be flipped in groups).

Continuation with the example, FIG. 9C depicts the metadata associated with an e-presentation that is shared with other owners/devices in order to collaborate on the e-presentation. In FIG. 9C, a third page (906) is added to the e-presentation. In this example, the third page is shared directly with another device (Device 1), while the second page (904) is still displayed on the active area of the e-flipchart apparatus. Device 1 (not shown) may be any smart phone, tablet, laptop, or desktop computer, a smart/interactive white board, or any other suitable device capable of displaying content and connecting to the e-flipchart apparatus or the shared e-presentation server (1002). Further, Device 1 may be connected to the e-flipchart apparatus via a point-to-point or a network connection that may be wired or wireless, such as via the Internet, or indirectly connected via a cloud server. Continuing with the data structure (900) content, the first page (902) remains inactive, and the second page (904) is updated to reflect that it is linked to page 1 (902) before and page 3 (906) after. In one or more embodiments of the invention, the state of the third page is also active, because even though it is not displayed on the e-flipchart apparatus, it is being displayed on another device (i.e., Device 1). Accordingly, the Display ID of the third page (906) is Device ID 1, which identifies Device 1.

Those skilled in the art will appreciate that page 3 (906) of the e-presentation as described in FIG. 9C above may be shared locally (i.e., in the same room with others viewing the e-presentation) or remotely (i.e., via a network connection to someone viewing the e-presentation on a remote device). Further, information may be sent and received by Device 1 and the e-flipchart apparatus bi-directionally, either through a server configured to store and manage the entire e-presentation file, or directly. Accordingly, a portion of or the entirety of e-presentations created on the e-flipchart apparatus may be shared and edited by a plurality of devices, all connected to the e-flipchart apparatus or to a shared e-presentation server. This allows for collaboration with audience members who are not physically located in the room where the e-flipchart is located.

Figure 10:
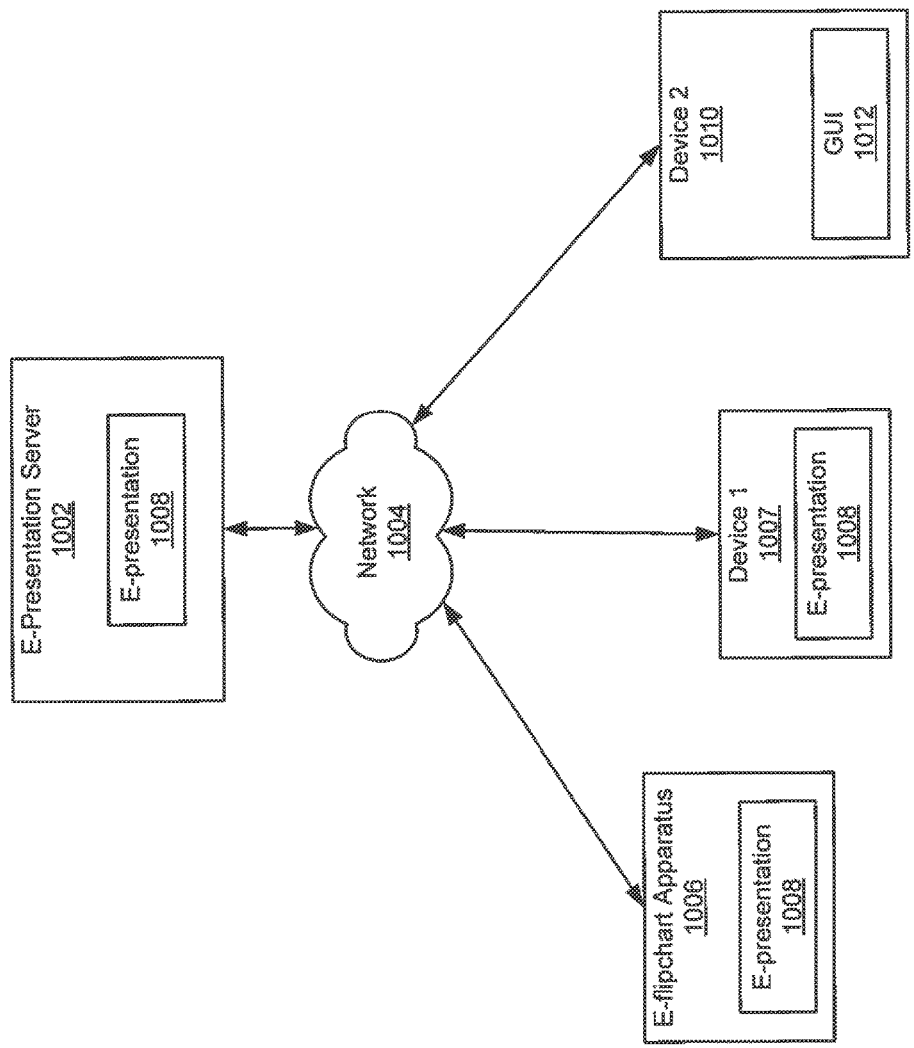
FIG. 10 shows a system for collaboration using an electronic flipchart in accordance with one or more embodiments.

FIG. 10 shows a system for sharing an e-presentation created on an e-flipchart apparatus in accordance with one or more embodiments of the invention. Specifically, FIG. 10 shows an e-presentation server (1002) connected via a network (1004) to the e-flipchart apparatus (1006) on which an e-presentation (1008) is created. In one or more embodiments of the invention, the e-presentation server (1002) may be a remote server configured to store and manage the e-presentation as a shared file. For example, the e-presentation server may be a cloud computing server or any other suitable type of server. In such cases, as shown in FIG. 10, the e-presentation server includes a copy of the e-presentation (1008). In one or more embodiments of the invention, the e-presentation server (1002) is configured to assign an e-presentation ID to an e-presentation when it is created or displayed on the e-flipchart apparatus display (1006). All the pages of an e-presentation are then associated with this e-presentation ID. In addition, the e-presentation server (1002) is configured to enforce the permissions of the e-presentation and may maintain and/or back-up the data structure (see e.g., FIG. 5) that is created for each e-presentation. The e-presentation server (1002) may also be configured to synchronize a shared e-presentation based on multiple contemporaneous inputs from other devices (e.g. 1007) connected to the same e-presentation.

In one embodiment of the invention, if multiple devices are concurrently editing an e-presentation, then when a specific device makes a change to the e-presentation, the device sends an incremental update to the e-presentation server (1002). In response to receiving the update, the e-presentation server updates its copy of the e-presentation and then sends the incremental update to all other devices (except the device that sent incremental update).

Continuing with the discussion of FIG. 10, the network (1004) may be any wired or wireless network configured to facilitate bi-directional communication between the e-presentation server (1002) and the e-flipchart apparatus and directly between device 1 (1007) and device 2 (1010). As described above, the network (1004) may be the Internet or any other suitable network. Device 1 (1007) and Device 2 (1010) may be local devices in the same room as the e-flipchart apparatus, or remote devices all connected to the e-flipchart apparatus via the e-presentation server (1002). Device 1 (1007) and Device 2 (1010) may be tablets, smart phones, laptops, desktop PCs, a wearable device, such as a an interactive watch or bracelet, or any other suitable device. Alternatively, one or more of Device 1 (1007) and Device 2 (1010) may be additional e-flipcharts. The system of FIG. 10 allows users to see and collaborate on e-presentations that may be updated by a remotely connected device in real-time. The following example illustrates this concept using the components of FIG. 10.

Suppose that Device 1 (1007) is in the same physical location as the e-flipchart (1006) and Device 2 (1010) is a remote device. A presenter/user of the e-flipchart apparatus (1006) may, while editing or showing the e-presentation, invite audience members to collaborate and provide input in the form of writing or drawing into the e-presentation that has been created and is being presented on the e-flipchart apparatus. In this case, the presenter/user may provide an input that results in Device 2 (1010) being granted permission to edit the e-presentation. In such scenarios, Device 2 (1010) may connect to the e-presentation server via the network (1004), download the e-presentation, and then edit the e-presentation concurrently with Device 1 (1008) and e-flipchart apparatus (1006). When Device 2 (1010) is finished editing, the e-presentation server may delete the Device 2 Display ID. Multiple pages of the e-presentation may be shared individually, or the entirety of the e-presentation may be shared using the system of FIG. 10. Further, multiple pages of an e-flipchart apparatus may be edited in parallel, and the e-presentation server may be configured to synchronize the e-presentation when editing is completed.

In an alternative embodiment, Device 2 (1010) may display a GUI (1012) on its screen with various buttons for different functions, one of them being a button with a page flip function. Using the GUI, Device 2 (1010) may manipulate what is being displayed on the active area on the e-flipchart apparatus, without having actual editing capability. In order for Device 2 (1010) to manipulate the content displayed on the e-flipchart, Device 2 (1010) must be connected to the e-flipchart apparatus (1006) or to the e-presentation server (1002). The connection may be wireless or wired. In this scenario, the owner of the e-presentation may provide Device 2 (1010) with the GUI by providing an input that allows Device 2 viewing permissions, but not editing permissions.

Those skilled in the art will appreciate that the e-flipchart apparatus may be used in any suitable environment, for example, where traditional paper flipcharts would conventionally be useful. For example, the e-flipchart apparatus may be used in conference rooms, classrooms, boardrooms, or any other suitable environment. In one or more embodiments of the invention, the e-flipchart apparatus is designed to connect to the outside world using digital technology such as network connections, and to keep a written record of what was written on the apparatus. In addition, with the e-flipchart apparatus of the present invention, the ability to create and store a presentation before it is presented before an audience on the e-flipchart apparatus is available. For example, the e-flipchart apparatus may have removable memory on which a presentation may already be created and stored, and when the removable memory is installed into the e-flipchart apparatus, the pre-created e-presentation may be shown on the reflective display. E-presentations created using the e-flipchart apparatus may be stored, copied, shared, revised, transferred, and managed using the information described above. Moreover, because the e-flipchart apparatus uses a reflective display, it mimics the look and feel of traditional paper flipcharts.

Figure 11:
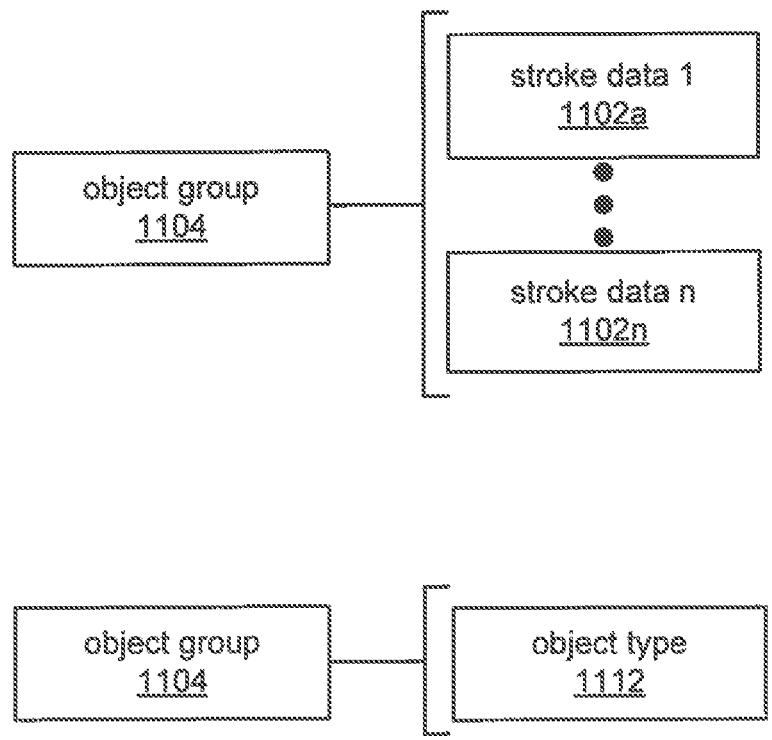
FIG. 11 shows relationships in accordance with one or more embodiments of the invention.

FIG. 11 shows relationships in accordance with one or more embodiments of the invention. Specifically, FIG. 11 shows the relationship between stroke data (1102a, 1102n) and an object group (1104) and the relationship between an object group (1104) and an object type (1112). Each of these relationships is described below.

As previously discussed, in one or more embodiments of the invention, stroke data (1102) is data pertaining to the stroke input (e.g., a dot, a line, a letter, a drawing, a word, or a series of words) made on the interactive display (104), using a digital marker, stylus pen, or user touch input.

In one or more embodiments of the invention, the object group (1104) is a logical grouping of a particular set of stroke data. For example, an object group (1104) may include all of the stroke data that make up a letter, a word, a phrase, a sentence, or a paragraph.

In one or more embodiments of the invention, the stroke data that is associated with an object group (1104) may be determined using, for example, time and proximity parameters as described below. FIG. 11 shows an object group (1104) that includes stroke data 1 (1102a) through stroke data n (1102n) ("stroke data 1-n"), which is related to stroke input 1 through stroke input n ("stroke inputs 1-n"). In one or more embodiments of the invention, stroke inputs 1-n may be any range or group of associated stroke input that the interactive device (104) receives. For example, stroke inputs 1-4 may include four separate strokes (e.g., four parallel lines) or four groups of strokes (e.g., four letters). Further, the object group (1104) encompassing stroke data 1-n may include a cumulative aggregation of all of the stroke data (1102) of stroke inputs 1-n. Alternatively, the object group (1104) encompassing stroke data 1-n may only include a selective aggregation of the stroke data (1102a, 1102n) of stroke inputs 1-n, based on the continuous classification and re-classification of the strokes as particular object types (1112) (discussed below). For example, if a user draws a letter, stroke data 1-n may relate to each and every individual stroke data for the letter. As another example, if a user is in the process of writing a sentence, stroke data 1-n may relate only to the last completed word or letter of the sentence. Thus, the granularity of the stroke data in an object group may vary depending on the object group that the user wishes to define.

In one or more embodiments of the invention, a particular object group (1104) may be associated with an object type (1112). In one or more embodiments of the invention, the object type (1112) may be a letter, a word, a sentence or a paragraph. Those skilled in the art will appreciate that the invention is not limited to the aforementioned object types.

In one embodiment of the invention, each individual piece of stroke data (1102a, 1102n) may be associated with one or more object groups, where each object group is associated with an object type. For example, consider a scenario in which a user wrote the phrase "Hello World" on an interactive display and that there are three object types: letter, word, and sentence. In this example, the stroke data corresponding to the letter "H" is associated with: (i) an object group of object type letter that is associated with all stroke data for letter "H", (ii) an object group of object type word associated with all stroke data corresponding to the word "Hello"; and (iii) an object group of object type sentence associated with all stroke data corresponding to the words "Hello World." In this manner, the stroke data is associated with a set of nested object groups, where each object group has a different level of granularity.

In one embodiment of the invention, each object group is associated with a state. The object group may be in an "open" state or in a "closed state." When an object group is in an "open" state, additional stroke data may be associated with the object group. When an object group is in a "closed" state, additional stroke data may not be associated with the object group.

In one embodiment of the invention, each user may only have one open object group per object type at any given time. For example, a given user may only be associated with one open object group for each of the following types at any one time—letter, word, and sentence. Accordingly, if there are multiple users using the interactive device, then each user may have its own open set of object groups.

Those skilled in the art will appreciate that the use of certain parameters that take into consideration both the time and proximity of the stroke input (time and proximity thresholds), allow the stroke input to be classified into object groups in a manner that is consistent with written language norms. By identifying and differentiating between object types in the embodiments described above, the invention facilitates certain formatting and manipulation functions of the stroke input, without the need to first convert the digital drawings and handwriting into corresponding ASCII, Unicode or other word processor-friendly text.

Figure 12:
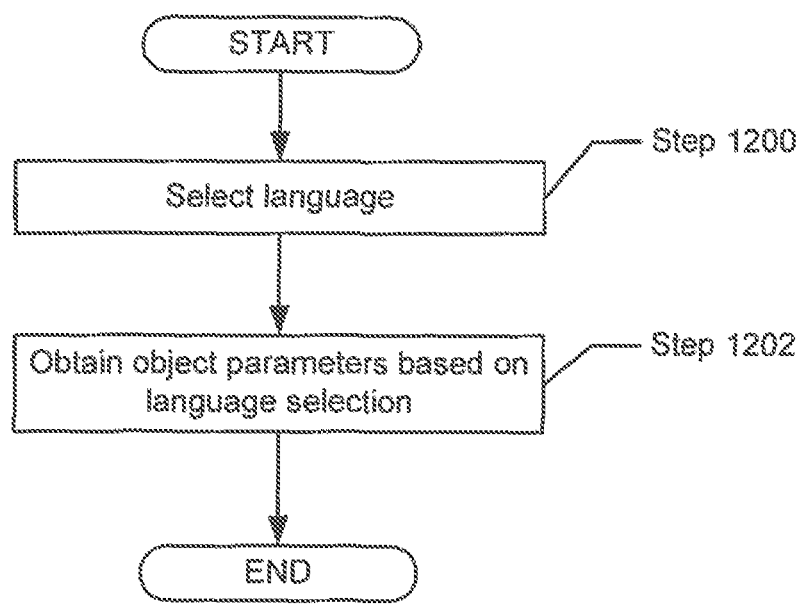
FIG. 12 shows a flowchart for initial system setup in accordance with one or more embodiments of the invention.
Figure 13:
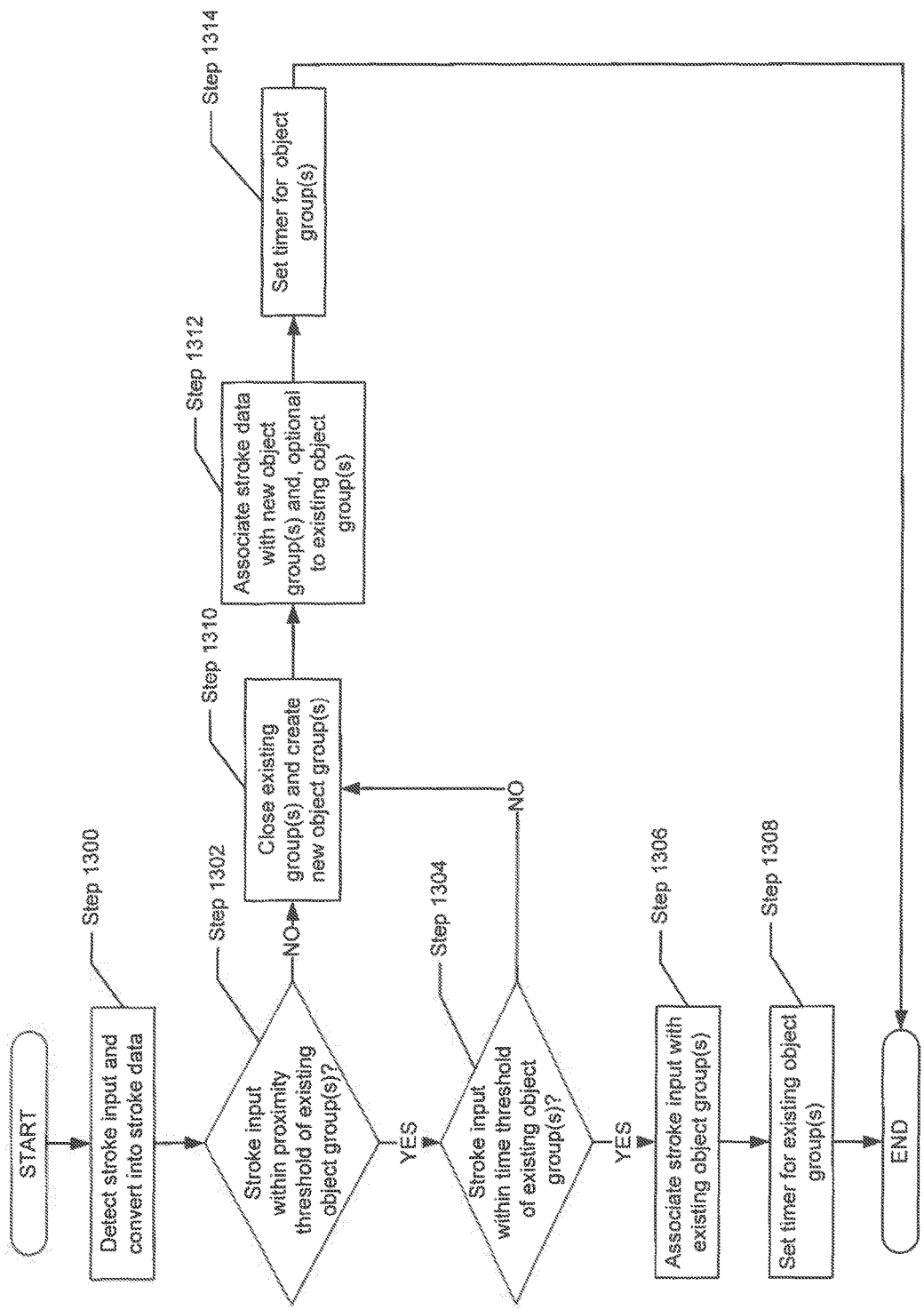
FIG. 13 shows a flowchart for grouping stroke data in accordance with one or more embodiments of the invention.
Figure 14:
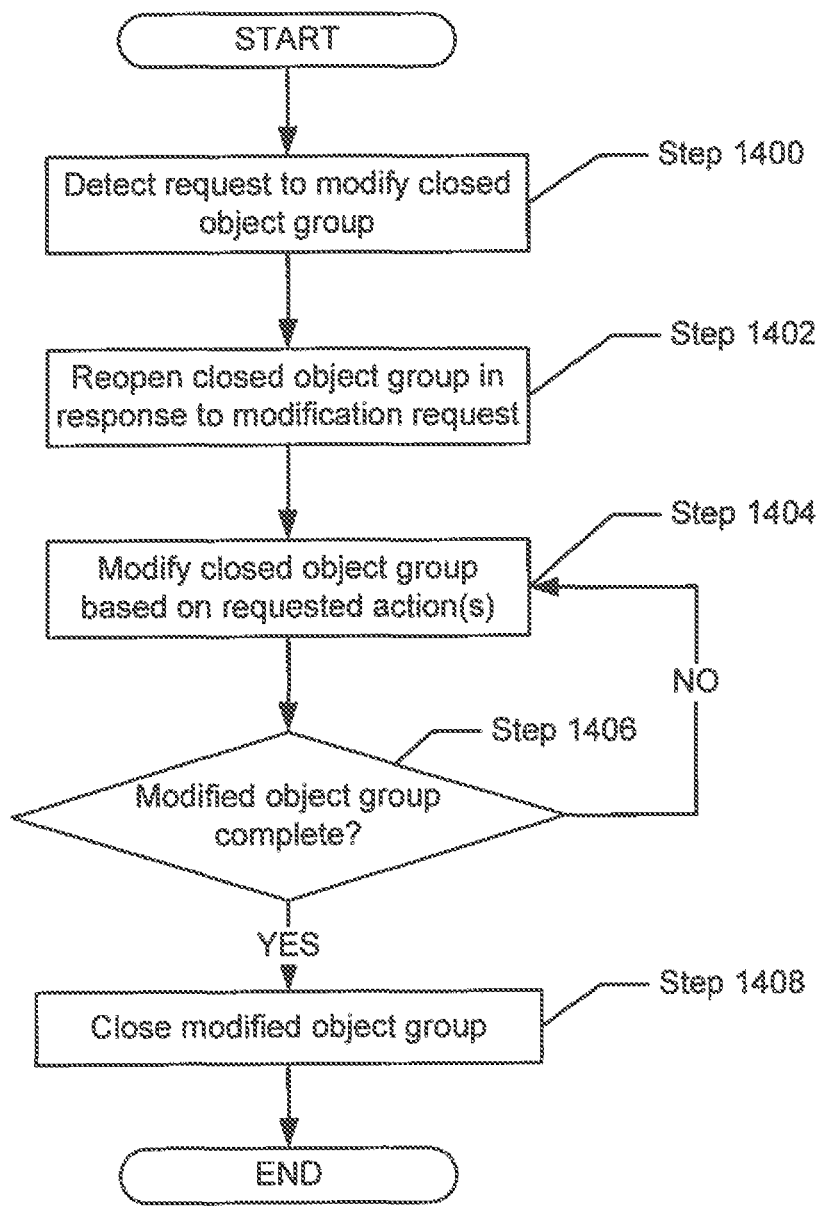
FIG. 14 shows a flowchart for manipulating a grouping of stroke data in accordance with one or more embodiments of the invention.

FIGS. 12-14 show flowcharts in accordance with one or more embodiments of the invention. More specifically, FIGS. 12-14 describe methods for categorizing and grouping stroke data in accordance with one or more embodiments of the invention. While the various steps in each flowchart are presented and described sequentially, one of ordinary skill in the art will appreciate that some or all of the steps may be executed in different orders, may be combined or omitted, and/or may be executed in parallel. In one embodiment of the invention, one or more steps shown in FIGS. 12-14 may be performed in parallel with one or more other steps shown in FIGS. 12-14. Furthermore, the steps may be performed actively or passively. For example, some steps may be performed using polling or be interrupt driven in accordance with one or more embodiments of the invention.

FIG. 12 shows a flowchart for initial system setup in accordance with one or more embodiments of the invention. In step 1200, the interactive device detects the selection of a particular language to be used by the system, such as English, Arabic, or Mandarin Chinese. As previously mentioned, the language selection may be used to facilitate the classification and grouping of the stroke input into object groups, based on the stroke data and object type(s) of the stroke input. In step 1202, the interactive device obtains certain parameters to be used by the system, based on the language selection. Those parameters may include, for example, various time and distance thresholds corresponding with the general written language conventions of the selected language. For example, the language selection may determine the spacing between characters (e.g., proportional to the average character size of the text written in the board), the direction that the text is read, etc.

FIG. 13 shows a flowchart for grouping stroke input in accordance with one or more embodiments of the invention. More specifically, FIG. 13 shows how certain stroke input is grouped into either a new or an existing object group(s).

In step 1300, stroke input is detected on the interactive display. The stroke input is then converted into stroke data.

In step 1302, a determination is made as to whether the stroke input is within a proximity threshold of an existing object group(s). In one embodiment of the invention, there may be one or more object groups that are currently in an "open" state (discussed above). The determination related to whether the stroke input (as defined by the stroke data) is within a proximity threshold may be performed on a per object group basis (if more than one object group is in an "open" state) or may be performed for only one object group of the set of object groups that are currently in an "open" state. As discussed above, the object groups may be associated with a user. In such instances, the determination in step 1302 is only performed on object groups associated with the user that provided the stroke input to generate the stroke data in step 1300.

In one or more embodiments of the invention, a proximity threshold is a requisite proximity value, based on a distance of the stroke input (as defined in stroke data) in relation to the distance of existing stroke input (as defined by corresponding stroke data) associated with an object group. There may be multiple proximity thresholds, which may be based on, among other things, the object type of the existing object group. As previously discussed, an object type is a logical subgrouping of a particular set of stroke input, which may be categorized as a marking, a stroke, a letter, a word, a sentence or a paragraph. An example of multiple proximity thresholds based on object types may include a first requisite proximity value associated with letters, a second requisite proximity value associated with words, a third requisite proximity value associated with sentences, etc. Additionally, one or more proximity thresholds may be defined during the initialization phase based on the selected language, as discussed above and in accordance with the embodiments in FIG. 12. Further, one or more proximity thresholds may be dynamically defined based on certain user-dependent stroke data, such as the average size of the user's handwriting when drawing the strokes.

Continuing with step 1302, if the stroke input is determined to be within the proximity threshold of the existing object group(s), then step 1304 is performed. In step 1304, a determination is made as to whether the stroke input (as defined by the stroke data) is within a time threshold of an existing object group(s). In one embodiment of the invention, the determination of whether stroke data is associated with a given object group may be based solely on the proximity threshold. In such instances, step 1304 is not performed.

In one embodiment of the invention, there may be one or more object groups that are currently in an "open" state (discussed above). The determination related to whether the stroke input is within a time threshold may be performed on a per object group basis (if more than one object group is in an "open" state) or may be performed for only one object group of the set of object groups that are currently in an "open" state. As discussed above, the object groups may be associated with a user. In such instances, the determination in step 1304 is only performed on object groups associated with the user that provided the stroke input to generate the stroke data in step 1300.

In one or more embodiments of the invention, a time threshold is a requisite time value, based on an amount of time elapsed between when the current stroke input was drawn (as defined by stroke data) and when the existing stroke input was drawn, enabling the current stroke input to be grouped into the same object group as the existing stroke input. As with the proximity threshold, there may be multiple time thresholds, which may be based on, among other things, the object type of the stroke input of the existing group or the selected language, as discussed above. Additionally, one or more time thresholds may be statically defined during the initialization phase, or dynamically defined based on certain user-dependent stroke data, such as the average time it takes a user to create certain stroke inputs.

Continuing with step 1304, if the stroke input is determined to be within the time threshold of the existing object group(s), after it has also been determined to be within the proximity threshold, then step 1306 is performed.

In step 1306, the stroke data is associated with the existing object group(s) that is currently in an "open" state. An object group may remain in an "open" state as long as the requisite proximity and time thresholds of the object group are met. Otherwise, the object group will be transitioned to a "closed" state. As discussed below, a closed object group may be reopened in accordance with the embodiments of FIG. 14. In one embodiment of the invention, if there are multiple object groups in an "open" state then the stroke data may be associated with multiple object groups. For example, consider a scenario in which the user has written the following on an interactive device "Wor" and then subsequently writes the stroke data corresponding to the letter "1". In this scenario, the stroke data corresponding to letter "1" may be associated with an object group of object type letter (which may be created using step 1310, discussed below), an object group of object type word (which also includes stroke data corresponding to the "W", "o", and "r") and an object group of object type sentence (which also includes stroke data corresponding to "W", "o", and "r").

In step 1308, upon associating the stroke data with the existing open object group(s), the timer(s) for the existing open object group(s) is set. In one or more embodiments of the invention, the timer(s) for the existing object group is used in determining whether the existing object group should continue to remain open or be closed. To make this determination, the timer(s) takes into consideration the relevant stroke data, object type(s) and time and proximity thresholds associated with the object group. After the timer expires for an existing object group, the object group is closed. If there are multiple open object groups (i.e., object groups with a state of "open"), then there may be a separate timer for each of the object groups. Further, the duration of the timer for each of the object groups may be the same or different. For example, the object group of object type word may have a shorter timer than an object group of object type sentence.

Turning back to step 1302, where a determination is made as to whether the stroke input (as defined by the stroke data) is within a requisite proximity threshold of an existing object group(s), if the stroke input is not within the requisite proximity threshold, then the stroke input is not added to the existing group(s). That is, when the current stroke input is detected too far away from the existing stroke previously made, even if the current stroke input is made within a required time threshold, the current stroke input is not added to the existing open group. Instead, the existing group is closed and the process moves to step 1310.

In one embodiment of the invention, if there are multiple open object groups then the determination in step 1302 is performed on a per object group basis and only open object groups for which the proximity threshold is exceed are closed.

For example, consider a scenario in which the user has written the following on an interactive device "Hello" and then the user writes a first stroke corresponding to a portion of the letter "W." Further assume that the distance between the first stroke corresponding to the letter "W" and the letter "o" is: (i) greater than a proximity threshold for an object group of object type letter, (ii) greater than a proximity threshold for an object group of object type word, and (iii) less than a proximity threshold for an object group of object type sentence. In this example, the object group of object type letter and the object group of object type word are closed but the object group of object type sentence remains open.

Continuing with the discussion of FIG. 13, in step 1310, a new object group(s) is created to accommodate the current stroke input (or, more specifically, the stroke data associated with the current stroke input). Step 1310 may include creating one or more new object groups. For example, consider a scenario in which the user has written the following on an interactive device: "Hello" and the current stroke input is a first stroke corresponding to a portion of the letter "W." Further assume that the distance between the first stroke corresponding to the letter "W" and the letter "o" is: (i) greater than a proximity threshold for an object group of object type letter, (ii) greater than a proximity threshold for an object group of object type word, and (iii) less than a proximity threshold for an object group of object type sentence. In this example, an object group of object type letter and the object group of object type word are closed but the object group of object type sentence remains open. Further, in step 1310, a new object of object type letter and a new object of object type word are created.

In step 1312, the stroke data is associated with the new object group(s). As with the previous discussion of step 1308, upon associating the stroke data with the new open object group. Continuing with the example described in Step 1310, the stroke data is associated with the new object of object type letter, the new object of object type word, and an existing object of object type sentence. In step 1314, the timer(s) for the new open object group(s) is set. The new object group(s) remains open as long as the timer does not expire. Further, in step 1314 if there are also existing object groups with which the stroke data is associated, then the timers associated with the existing object groups are also set. Continuing with the example described in Step 1312, a timer is set for the new object of object type letter, for the new object of object type word, and for an existing object of object type sentence.

FIG. 14 shows a flowchart for manipulating a grouping of stroke data in accordance with one or more embodiments of the invention. More specifically, FIG. 14 shows how a closed object group may be reopened and modified to include new stroke input. As discussed above, a closed object group is an object group that has been finalized and is closed to the inclusion of subsequent stroke input. An object group may remain open as long as the requisite proximity and time thresholds of the object group are met, thereby preventing the expiration of the object group's timer. Upon the expiration of the object group's timer, the object group will be closed.

In step 1400, a request to modify a closed object group is detected. The request may be sent as a result of a user selecting the closed object group, using the selection tools of the interactive device. For example, the user may select an area corresponding to the closed object group by using a finger (touch input) or a digital marker to draw a circle around the area. Once the desired object group has been selected, the user can reactivate the closed object group by selecting the appropriate button or prompt on the interactive display.

In step 1402, the closed object group is reopened in response to the modification request. Upon reactivating the closed object group in step 1400, the closed object group is reopened and all other object groups are closed. The user may then request to modify certain elements of the reactivated group, as further discussed below.

In step 1404, the closed object group is modified based on the requested modification action. A requested modification action may include reformatting the group, removing or modifying stroke input within the object group, or adding new stroke input to the object group. For example, reformatting the object group may include, among other things, resizing an area of the object group, and modifying the structure of the object group to re-accommodate the stroke input after the area is resized, in accordance with the embodiments shown in FIGS. 15D-15E and as further discussed below. As another example, removing or modifying stroke input may include completely erasing certain stroke data within the object group, or making certain changes to the stroke input, such as changing the spelling of a word or adding a punctuation marks. Further, when a user reopens a previously closed object group, subsequent stroke data may be added to the existing object group.

In step 1406, a determination is made as to whether the modified object group is complete. In one or more embodiments of the invention, the modified object group is complete when modification actions should no longer be executed within the modified object group. The determination of whether the modified object group is complete may be made in response to the user selecting a certain prompt to indicate that the modified object group is complete. Additionally, in the absence of the user indicating that the modified object group is complete, the determination may be made based on a timer of the modified object group. The timer is used to determine whether subsequent stroke input or modification actions are made within the requisite proximity and time thresholds associated with the modified object group. In step 1406, if the modified object group is not complete, then any subsequent modification actions will continue to be executed within the modified object group, until the modified object group is complete. In step 1408, upon the completion of the modified object group, the modified object group is closed and any subsequent modifications are not included within the modified object group.

FIGS. 15A-E show examples of one or more of the method steps described in FIGS. 13-14, in accordance with one or more embodiments of the invention.

FIG. 15A illustrates how certain stroke data is derived from stroke input drawn on an interactive device. Specifically, FIG. 15A(i) provides an illustration of the strokes comprising an uppercase letter "E", drawn on an interactive display using a digital marker (1510), and the start/end points of the strokes. In this example, the letter E is comprised of four separate strokes (1502, 1504, 1506, 1508), each of which has a corresponding starting point and ending point. The first stroke (1502) is a vertical line with starting point 1512 and ending point 1514. The second stroke (1504) is a horizontal line with starting point 1516 and ending point 1518. The third stroke (1506) is a horizontal line with starting point 1520 and ending point 1522. The fourth stroke (1508) is a horizontal line with starting point 1524 and ending point 1526.

Continuing with FIG. 15A, 15A(ii) illustrates how the four strokes in FIG. 15A(i) are grouped as a single object, based on certain predetermined parameters. In this example, the predetermined parameters take into consideration the proximity of the start or end point of a stroke, in relation to subsequent strokes (requisite proximity) (1530). The predetermined parameters also take into consideration the amount of time elapsed between each stroke (requisite time) (1528). If the stroke input meets both the proximity and time elements of the predetermined parameters, then it is grouped as a single object (1532).

Turning back to FIG. 15A(i) and using the logic of FIG. 15(A)(ii), if the starting point (1516) of the second stroke (1504) is drawn within the requisite time (1528) and requisite proximity (1530) of the first stroke (1502), then both strokes are grouped as a single object. Similarly, if the third stroke is drawn within the requisite time and proximity of the second stroke, and the fourth stroke is drawn within the requisite time and proximity of the third stroke, then all four strokes are grouped as a single object, as illustrated in FIG. 15(A)(iii). In doing so, the strokes are now categorized as a letter ("E"), as opposed to four separate strokes.

Figure 15C:
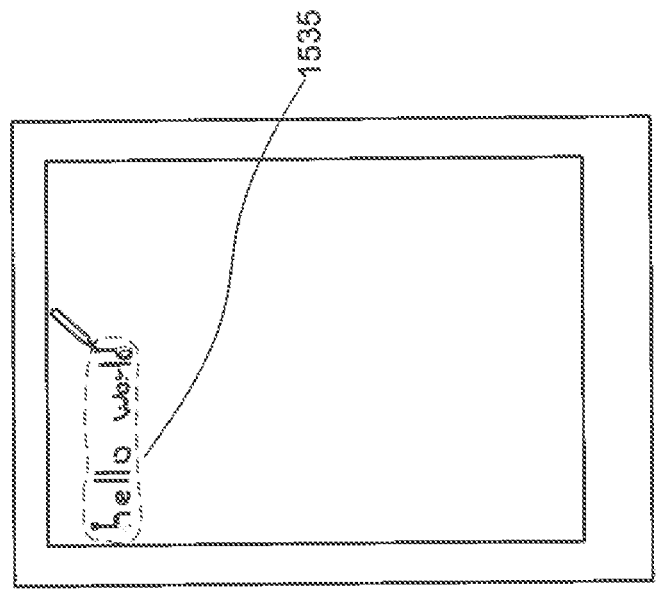
Figure 15B:
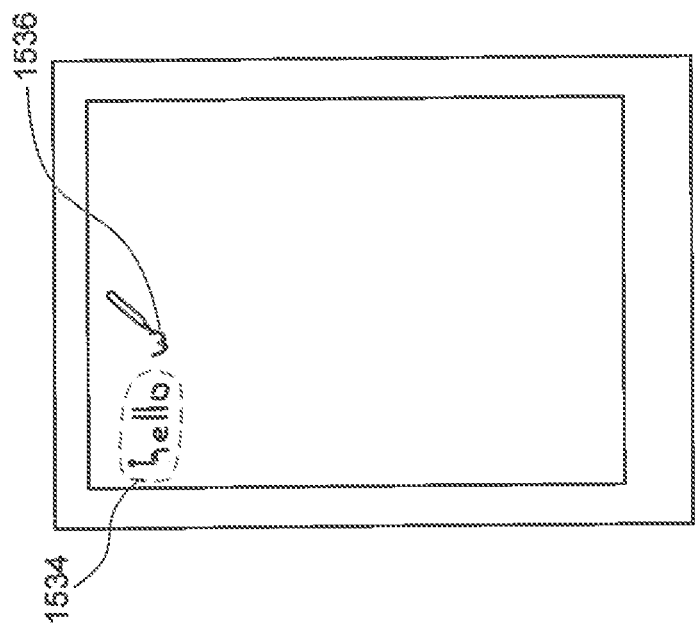

FIGS. 15B-15D further expand on the concept illustrated in FIG. 15A. FIG. 15B shows an object group comprising the word "hello" (1534) and the letter "w" (1536). The word "hello" (1534) consists of a first group of letters that are drawn within the requisite time and proximity parameters to be associated with an object group of object type word. As such, the first group of letters is associated with an object group of object type word. In contrast, the letter "w" (1536) is outside of the requisite proximity parameters associated with the object group of object type word, and is therefore not included as a part of the object group. However, the letter "w" (1536) may still be included in the existing object group (1534) if it is drawn within the requisite time and proximity parameters of the existing object group (1534), as shown in FIG. 15C and discussed below.

FIG. 15C shows the existing object group from FIG. 15B, which now comprises the words "hello" and "world" (1534). As discussed above, "hello" consists of the first group of letters, which are associated with an object group of object type word. Further, "world" consists of a second group of letters, which are associated with a second object group of object type word. Additionally, the second word is drawn within the requisite time and proximity parameters of the existing object group, based on the relationship between the ending point of a stroke of the first word and the starting point of a subsequent stroke of the second word. As such, the stroke data associated with the object group for "world" and the stroke data associated with the object group for "hello" may also be associated with an object group of object type sentence (1535).

FIG. 15D shows an object group comprising multiple words. The multiple words are drawn within the requisite time and proximity parameters such that all stroke data for the stroke input shown in FIG. 15D is associated with an object group (1537) of object type sentence.

FIG. 15E illustrates how a single object group comprising multiple strokes, may be formatted as a group, rather than as individual strokes. More specifically, FIG. 15E shows the existing object group (1537) resized within a certain area of the interactive display. In this example, when the existing object group (1537) is resized, the structure of the sentence is also modified to re-accommodate the stroke input within the sentence. As a result, certain stroke input is moved to a different row of the sentence. In one or more embodiments of the invention, the stroke input is re-accommodated based, at least in part, on the object type(s) of the stroke input within the sentence. For example, continuing with FIG. 15E, the single letter "a" (1538) may be singularly re-accommodated to the third row of the sentence (by associating the stroke data for "a" to the existing object group (1537), as result of resizing the display of the stroke data associated with the object group. However, the letter "t" (1540), which is a part of the word object type "today" (1542) may not be singularly moved as it is part of the object group of object type word. Instead, the word "today" is re-accommodated to the new object type size, by shifting the entire word to the second row, as shown in FIG. 15E. One skilled in the art would appreciate that this method of re-accommodation helps to preserve the original meaning of the sentence, by preserving the integrity of each object type that exists within the sentence.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for formatting data comprising:
   detecting a stroke input;
   converting the stroke input into stroke data;
   making a first determination that the stroke data should be grouped with an existing object group using a proximity threshold;
   based on the first determination, associating the stroke data with the existing object group;
   after the existing object group is closed:
   receiving a modification request to modify the existing object group;
   reopening the existing object group in response to the modification request; and
   adding additional stroke data associated with a second object group to the existing object group,
   after adding the additional stroke data to the existing object group:
   receiving a formatting request for the existing object group; and
   formatting all stroke data associated with the existing object group in response to the formatting request.

2. The method of claim 1, further comprising:
   after associating the stroke data with the existing object group:
   resetting a timer associated with the existing object group.

3. The method of claim 1, wherein making the first determination further comprises using a time threshold.

4. The method of claim 1, wherein making the first determination comprises determining that a distance between at least a portion of the stroke input and at least a portion of the existing object group is within the proximity threshold.

5. The method of claim 1, wherein making the first determination further comprises determining that a time elapsed, between the stroke input and at least one other stroke input associated with the existing object group, is within a time threshold.

6. The method of claim 1, further comprising:
detecting a second stroke input;
converting the second stroke input into second stroke data;
making a second determination that the second stroke data should not be grouped with the existing object group using the proximity threshold; and
based on the second determination, associating the second stroke data with a new object group.

7. The method of claim 6, wherein making the second determination comprises determining that a distance between at least a portion of the second stroke input and at least a portion of the existing object group is not within the proximity threshold.

8. The method of claim 6, wherein making the first determination further comprises using a time threshold and wherein making the second determination comprises determining that a time elapsed between the second stroke input and at least one other stroke input associated with the existing object group is not within the time threshold.

9. The method of claim 6, further comprising:
based on the second determination, closing the existing object group.

10. The method of claim 1, wherein the stroke input comprises a marking made by touch input or input via a digital marker.

11. The method claim 1, wherein the existing object group is associated with an object type.

12. The method of claim 11, wherein the object type comprises at least one selected from the group consisting of a marking, a letter, a word, a sentence, and a paragraph.

13. The method of claim 1, further comprising:
prior to detecting the stroke input, obtaining a language selection, wherein the proximity threshold is based, at least in part, on the language selection.

14. The method of claim 1, further comprising:
making a second determination that the stroke data should be grouped with a second existing object group using at least the proximity threshold; and
based on the second determination, associating the stroke data with the second existing object group,
wherein the existing object group is associated with a first object type and the second existing object group is associated with a second object type,
wherein the first object type is different than the second object type.

15. A non-transitory computer readable medium comprising instructions, which when executed by a processor, performs a method, the method comprising:
detecting a stroke input;
converting the stroke input into stroke data;
making a first determination that the stroke data should be grouped with an existing object group using a proximity threshold;
based on the first determination, associating the stroke data with the existing object group;
after the existing object group is closed:
receiving a modification request to modify the existing object group;
reopening the existing object group in response to the modification request; and
adding additional stroke data associated with a second object group to the existing object group,
after adding the additional stroke data to the existing object group:
receiving a formatting request for the existing object group; and
formatting all stroke data associated with the existing object group in response to the formatting request.

16. The non-transitory computer readable medium of claim 15, the method further comprising:
after associating the stroke data with the existing object group:
resetting a timer associated with the existing object group.

17. The non-transitory computer readable medium of claim 15, wherein making the first determination further comprises using a time threshold.

18. The non-transitory computer readable medium of claim 15, wherein making the first determination comprises determining that a distance between at least a portion of the stroke input and at least portion of the existing object group is within the proximity threshold.

19. The non-transitory computer readable medium of claim 15, wherein making the first determination further comprises determining that a time elapsed between the stroke input and at least one other stroke input associated with the existing object group is within a time threshold.

20. The non-transitory computer readable medium of claim 15, the method further comprising:
detecting a second stroke input;
converting the second stroke input into second stroke data;
making a second determination that the second stroke data should not be grouped with the existing object group using the proximity threshold; and
based on the second determination, associating the second stroke data with a new object group.

21. The non-transitory computer readable medium of claim 20, wherein making the second determination comprises determining that a distance between at least a portion of the second stroke input and at least portion of the existing object group is not within the proximity threshold.

22. The non-transitory computer readable medium of claim 20, wherein making the first determination further comprises using a time threshold and wherein making the second determination comprises determining that a time elapsed between the second stroke input and at least one other stroke input associated with the existing object group is not within the time threshold.

23. The non-transitory computer readable medium of claim 20, the method further comprising:
based on the second determination, closing the existing object group.

24. The non-transitory computer readable medium of claim 15, wherein the stroke input comprises a marking made by touch input or input via a digital marker.

25. The non-transitory computer readable medium of claim 15, wherein the existing object group is associated with an object type, wherein the object type comprises at least one selected from the group consisting of a marking, a letter, a word, a sentence, and a paragraph.

26. The non-transitory computer readable medium of claim 15, the method further comprising:
prior to detecting the stroke input, obtaining a language selection, wherein the proximity threshold is based, at least in part, on the language selection.

27. The non-transitory computer readable medium of claim 15, the method further comprising:

making a second determination that the stroke data should be grouped with a second existing object group using at least the proximity threshold; and based on the second determination, associating the stroke data with the second existing object group, wherein the existing object group is associated with a first object type and the second existing object group is associated with a second object type, wherein the first object type is different than the second object type.

* * * * *